(12) United States Patent
Kiyoto et al.

(10) Patent No.: US 9,720,153 B2
(45) Date of Patent: Aug. 1, 2017

(54) INFRARED RAY SHIELDING FILM

(71) Applicant: FUJIFILM Corporation, Tokyo (JP)

(72) Inventors: Naoharu Kiyoto, Ashigarakami-gun (JP); Katsuhisa Ohzeki, Ashigarakami-gun (JP); Shinya Hakuta, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 102 days.

(21) Appl. No.: 14/486,324

(22) Filed: Sep. 15, 2014

(65) Prior Publication Data
US 2015/0002928 A1 Jan. 1, 2015

Related U.S. Application Data

(63) Continuation of application No. PCT/JP2013/057126, filed on Mar. 14, 2013.

(30) Foreign Application Priority Data

Mar. 16, 2012 (JP) ................................. 2012-060998
Mar. 29, 2012 (JP) ................................. 2012-078047

(51) Int. Cl.
*F21V 9/06* (2006.01)
*G02B 5/20* (2006.01)
(Continued)

(52) U.S. Cl.
CPC ............ *G02B 5/208* (2013.01); *C03C 17/007* (2013.01); *G02B 5/206* (2013.01);
(Continued)

(58) Field of Classification Search
CPC .......... G02B 5/208; G02B 5/206; G02B 5/26; C03C 17/007; C03C 2217/445;
(Continued)

(56) References Cited

U.S. PATENT DOCUMENTS 4,923,638 A * 5/1990 Ohno .................... B41M 5/465
                                                 252/587
6,395,398 B1 5/2002 Nakashima et al.
(Continued)

FOREIGN PATENT DOCUMENTS

CN    102050584 A   5/2011
JP       3454422 B2  10/2003
(Continued)

OTHER PUBLICATIONS

Chinese Office Action dated Jan. 29, 2016, issued in corresponding Chinese Patent Application No. 201380013305.X with English translation.
(Continued)

*Primary Examiner* — Scott J Sugarman
*Assistant Examiner* — Mustak Choudhury
(74) *Attorney, Agent, or Firm* — Birch, Stewart, Kolasch & Birch, LLP

(57) ABSTRACT

An infrared ray shielding film having a metal particle-containing layer in which hexagonal to circular tabular metal particles are contained in 60% by number or more relative to total number of the metal particles contained in the metal particle-containing layer exhibits excellent infrared ray reflection at a wide range of from 800 nm to 2000 nm and shows little heat ray absorption.

16 Claims, 7 Drawing Sheets

(51) Int. Cl.
*G02B 5/08* (2006.01)
*F21V 9/04* (2006.01)
*C03C 17/00* (2006.01)
*G02B 5/26* (2006.01)

(52) U.S. Cl.
CPC .. *C03C 2217/445* (2013.01); *C03C 2217/479* (2013.01); *C03C 2218/11* (2013.01); *G02B 5/26* (2013.01)

(58) Field of Classification Search
CPC ........... C03C 2217/479; C03C 2218/11; C03C 17/42; C03C 17/008; B41M 5/465; B29C 33/68
USPC .................. 359/359, 360, 361; 428/328; 252/182.33, 582, 587, 71
See application file for complete search history.

(56) References Cited

U.S. PATENT DOCUMENTS

| | | | |
|---|---|---|---|
| 6,689,256 B2 | 2/2004 | Nakashima et al. | |
| 2002/0142149 A1 | 10/2002 | Nakashima et al. | |
| 2006/0210768 A1* | 9/2006 | Masuda | B29C 33/68 428/141 |
| 2007/0159157 A1* | 7/2007 | Sano | H05K 3/1266 324/71.4 |
| 2011/0111210 A1* | 5/2011 | Matsunami | C03C 17/007 428/328 |
| 2011/0181820 A1 | 7/2011 | Watanabe | |
| 2013/0071651 A1 | 3/2013 | Hakuta et al. | |
| 2013/0122281 A1 | 5/2013 | Hakuta et al. | |

FOREIGN PATENT DOCUMENTS

| | | |
|---|---|---|
| JP | 2007-178915 A | 7/2007 |
| JP | 2011-118347 A | 6/2011 |
| JP | 2011-154215 A | 8/2011 |
| JP | 2011-253093 A | 12/2011 |
| JP | 2011-253094 A | 12/2011 |
| JP | 2012-18223 A | 1/2012 |
| JP | 2012-37634 A | 2/2012 |

OTHER PUBLICATIONS

Japanese Office Action with a partial English translation thereof, dated Jun. 16, 2015, for corresponding Japanese Application No. 2012-060998.

Japanese Office Action with a partial English translation thereof, dated Jun. 16, 2015, for corresponding Japanese Application No. 2012-078047.

International Preliminary Report on Patentability dated Sep. 25, 2014, issued in PCT/JP2013/057126 (Forms PCT/IB/338, PCT/IB/373, PCT/ISA/237 and PCT/IB/326).

International Search Report, issued in PCT/JP2013/057126, dated Jun. 25, 2013.

Written Opinion of the International Searching Authority, issued in PCT/JP2013/057126, dated Jun. 25, 2013.

* cited by examiner

Image before RMS Patching Treatment

Blackening Rate = 0.35707

Image Size After RMS Patching Treatment = 120

Calculation Results With Histogram

RMS = 17.6218    Mean Value = 145.7726

INFRARED RAY SHIELDING FILM

CROSS-REFERENCE TO RELATED APPLICATIONS

This application is a continuation application of International Application No. PCT/JP2013/057126, filed Mar. 14, 2013, which in turn claims the benefit of priority from Japanese Application No. 2012-060998, filed Mar. 16, 2012, and Japanese Application No. 2012-078047, filed Mar. 29, 2012, the disclosures of which applications are incorporated by reference herein in their entirety.

BACKGROUND OF THE INVENTION

Field of the Invention

The present invention relates to an infrared ray shielding film having excellent heat shieldability. More specifically, a second aspect of the present invention relates to a heat ray shielding material which has high visible light transmittance and a high mean solar reflectance, and is capable of reflecting infrared light over a wide band.

Background Art

In recent years, as one of energy saving measures for reducing carbon dioxide, heat ray shieldability-imparting materials have been developed for windows of vehicles and buildings.

As an infrared ray shielding filter, a filter using tabular Ag particles has been proposed (see Patent Literature 1). However, since the infrared ray shielding filter described in Patent Literature 1 is intended to be used in plasma display panels (PDP) and since such tabular Ag particles are not provided with configuration control, the filter mainly functions as a wavelength infrared ray light absorbent in an infrared ray region and does not function as a material that proactively reflects heat rays. Consequently, when the infrared ray shielding filter including such tabular Ag particles is used for shielding direct sunlight, the infrared ray absorbent filter itself would be warmed to increase the ambient temperature owing to the heat thereof and therefore its function as an infrared ray shielding material was insufficient.

Patent Literature 2 describes a wavelength-selective film using granular silver. In Patent Literature 2, an Ag layer in which granular silver particles are distributed is formed through Ag sputtering and heat treatment; and according to FIG. 3 in this reference, many granular silver particles have an atypical form.

On the other hand, Patent Literature 3 discloses a heat ray shielding material which has tabular metal particles having a hexagonal to circular form in a proportion of 60% by number or more and in which the main plane of the hexagonal to circular tabular metal particles is plane-oriented in a range of from 0° to ±30° on average relative to one surface of the metal particle-containing layer. Patent Literature 4 does not describe a preferred range of the thickness of the metal particle-containing layer, and in Examples therein, an aspect in which the metal particle-containing layer is from 0.1 μm to 0.5 μm, or that is, from 100 nm to 500 nm is disclosed.

Patent Literature 4 discloses a heat ray shielding material which contains hexagonal to hexagonal to circular tabular metal particles in a proportion of 60% by number or more, in which the hexagonal to circular tabular metal particles have two absorption peaks, and shield a relatively wide range of a wavelength region.

From the viewpoint of heat ray shieldability, a heat reflective type having no reradiation rather than a heat absorptive type one having indoor reradiation of absorbed light (in an amount of about ⅓ of the absorbed solar energy) is preferable, for which various proposals have been made. Since the infrared light in the sunlight is over a wide band, a heat ray shielding material that reflects infrared light over a wide band at 800 nm to 2,500 nm has been demanded from the viewpoint of solar reflectance.

Patent Literature 5 discloses a heat ray shielding material which has hexagonal to circular tabular metal particles in a proportion of 60% by number or more and a low coefficient of variation of the distribution of the distance between centers of silver particles.

Patent Literature 2 discloses a heat ray shielding material which has hexagonal to circular tabular metal particles in a proportion of 60% by number or more and in which the main plane of the hexagonal to circular tabular metal particles is plane-oriented in a range of from 0° to ±30° on average relative to one surface of the metal particle-containing layer.

Patent Literature 1 discloses an infrared ray shielding filter for a plasma display panel using tabular silver particles, which has excellent visible region transmittance and infrared ray shieldability.

CITATION LIST

Patent Literatures

Patent Literature 1: JP-A-2007-178915
Patent Literature 2: Japanese Patent No. 3454422
Patent Literature 3: JP-A-2011-118347
Patent Literature 4: JP-A-2011-253093
Patent Literature 5: JP-A-2011-253094

SUMMARY OF INVENTION

Investigations made by the present inventors have revealed a problem that the infrared ray shielding filter described in Patent Literature 1 and the solar reflection as described in Patent Literature 3 are of an infrared ray absorption type, and therefore, when they are used for shielding the heat of sunlight, the infrared ray absorbent itself is warmed to increase the ambient temperature. In addition, when they are stuck to windowpanes, there occurs another problem that the glass is cracked since the temperature increase differs between the part on which sunlight reaches and the part on which sunlight does not reach (heat crack).

In Patent Literature 2, when infrared rays are shielded by granular silver, there is a problem in that it is impossible to sharply shield infrared rays since the half-value width of the spectrum is large, or that is, there is a problem in that the film could not fully shield infrared rays on a shortwave side having a large amount of sunlight energy.

The heat ray shielding material described in Patent Literature 3 can reflect infrared rays and is advantageous as an infrared ray shielding film. However, a number of the heat ray shielding materials described in Patent Literature 3 use single particles having similar shapes, and therefore, infrared rays at a wide range of wavelength could not be shielded. In Example 34 of Patent Literature 3, an aspect in which two kinds of tabular silver particles having different coefficient of variations of mean particle diameters is described, but in this embodiment, the metal particle-containing layer is thick and could thus not exert the performance of the metal particles sufficiently, and therefore it can be seen that there is a problem in the performance of the heat ray reflection.

The heat ray shielding material described in Patent Literature 4 can reflect infrared rays and is advantageous as an infrared ray shielding film. However, silver particles are applied to multiple layers, and further, it is required to strictly control the distance between the layers, and therefore, it has a problem in cost and production efficiency due to complex production.

The present invention is to solve the above-mentioned various problems. That is, it is a problem to be solved by a first aspect of the present invention to provide an infrared ray shielding film which reflects infrared rays in a wide range (from 800 nm to 2000 nm) (heat ray reflection), and has little absorption (heat ray absorption).

On the other hand, according to the investigations conducted by the present inventors, in Patent Literature 1, there is no description of uneven distribution of tabular silver particles, the inclination to coated surfaces of tabular silver particles or the distribution of the coated surfaces in the thickness direction is random, and only absorption occurs. Further, the arrangement in the plane is also insufficient. When the tabular silver particles are arranged randomly as described in Patent Literature 1, only absorption occurs, whereas when tabular silver particles are arranged regularly as described in Patent Literatures 5 and 3, reflection occurs and thus they are advantageous as the heat ray shielding materials. However, in Patent Literature 1, there is no intention of reflection of heat rays by arranging the tabular silver metal particles regularly, and an infrared ray absorption type of an infrared ray shielding filter was provided. In such an infrared ray absorption type of an infrared ray shielding filter described in Patent Literature 1, when used for heat shielding against sunlight, there occurs a problem that an infrared ray absorber is warmed and thus the ambient temperature is raised. Further, when it is stuck to windowpanes, there occurs a problem, for example, that the glass is cracked since the temperature increase differs between the part on which sunlight reaches and the part on which sunlight does not reach (heat crack).

Meanwhile, the present inventors have investigated the performance of the heat ray shielding material described in Patent Literature 5, and many examples in which the coefficient of variation of the circle-equivalent diameters of the tabular silver particles used is reduced to 10% or less are described. In this case, it could be found that infrared rays cannot be shielded across a wide band region. Further, in Patent Literature 5, an example in which the coefficient of variation of the circle-equivalent diameter increases and the coefficient of variation of the distance between the centers of the tabular silver particles is reduced is also described. However, in this case, the density deviation of the tabular silver particles increases (the RMS granularity as described later increases), which was unsatisfactory from the viewpoint of visible light transmittance and sufficient reflection of infrared light over a wide band.

Furthermore, for the infrared ray shielding material of Patent Literature 3, many examples in which the coefficient of variation of the circle-equivalent diameters of the tabular silver particles is reduced to 12% or less are described. In this case, it could be found that infrared rays cannot be shielded across a wide band. In addition, in Examples 7, 8, 13, and 34 of Patent Literature 3, an example in which the coefficient of variation of the circle-equivalent diameter is increased and the distance between the molecules is set randomly is also described. It is however unsatisfactory from the viewpoint of visible light transmittance and sufficient reflection of infrared light over a wide band.

The present invention is to solve the above-mentioned various problems in the related art. A second aspect of the present invention is to provide a heat ray shielding material which has high visible light transmittance and mean solar reflectance, and is capable of reflecting infrared light over a wide band.

The present inventors have conducted extensive studies to solve the problems as described above, and as a result, they have found that when the shapes of the tabular metal particles are excessively random, the heat ray shielding performance is deteriorated.

To the contrary, in the present invention, it has been found that by forming a metal particle-containing layer having hexagonal to circular tabular metal particles in a proportion of 60% by number or more, having at least two absorption peaks or at least two reflection peaks in the region of 800 nm to 2000 nm, infrared rays at a wide range (from 800 nm to 2000 nm) are reflected (heat ray reflection), and thus, an infrared ray shielding film having little absorption (heat ray absorption) can be obtained.

As the present inventors have conducted extensive studies, they have found that the heat ray shielding materials described in Examples of Patent Literatures 1 and 3 have a high density deviation of tabular silver particles. Here, in the silver salt photograph, a concept referred to as an RMS granularity is frequently used, and the RMS granularity is described in, for example, "Revised Fundamentals of Photography Engineering—Silver Salt Photography—(Corona Publishing Co., Ltd., 1998)", P. 504. For the RMS granularity in this silver salt photography field, the present inventors have found that when an RMS granularity obtained by extracting tabular metal particles by binarizing the electron microscope photos and adjusting the aperture diameter to 0.6 μm square is used, the density deviation of the tabular metal particles of the heat ray shielding material using the tabular metal particles (density deviation of the tabular metal particles as seen in macro) can be seen with high precision. In fact, they could find that when the RMS granularity of the heat ray shielding material described in Examples of Patent Literatures 1 to 3 using the RMS granularity is checked, the RMS granularity is high.

Furthermore, the present inventors have made extensive studies, and as a result, they have found that when the coefficient of variation of the circle-equivalent diameter of the tabular metal particles is large, infrared rays in a wide band can be shielded.

Based on this finding, the present inventors have consequently found that by providing the circle-equivalent diameters of the tabular metal particles with a large coefficient of variation, and simultaneously lowering the RMS granularity, a heat ray shielding material which has high visible light transmittance and mean solar reflectance, and is capable of reflecting infrared light over a wide band can be obtained.

Based on the findings above by the present inventors, the present invention has means for solving the problems as described as follows.

[1] An infrared ray shielding film having a metal particle-containing layer that contains at least one kind of metal particle,
wherein hexagonal to circular tabular metal particles are contained in 60% by number or more relative to total number of the metal particles contained in the metal particle-containing layer.

[2] Preferably, in the infrared ray shielding film as described in [1], at least one of the metal particle-containing layers has at least two absorption peaks or at least two reflection peaks in the region of 800 nm to 2000 nm.

[3] Preferably, in the infrared ray shielding film as described in [1] or [2], at least one of the metal particle-containing layers has at least two transmission peaks in the region of 800 nm to 2000 nm.

[4] Preferably, in the infrared ray shielding film as described in any one of [1] to [3], the metal particle-containing layer having at least two absorption peaks or at least two reflection peaks a region of 800 nm to 2000 nm has hexagonal to circular tabular metal particles in 60% by number or more relative to total number of metal particles contained in the metal particle-containing layer, and includes at least two kinds of hexagonal to circular tabular metal particles having a coefficient of variation of circle-equivalent mean diameters of 35% or less.

[5] Preferably, in the infrared ray shielding film as described in any one of [1] to [4], the metal particle-containing layer having at least two absorption peaks or at least two reflection peaks in the region of 800 nm to 2000 nm has hexagonal to circular tabular metal particles in 60% by number or more relative to total number of metal particles contained in the metal particle-containing layer, and the coefficient of variation of the circle-equivalent mean diameters of the hexagonal to circular tabular metal particles is 35% or less.

[6] Preferably, in the infrared ray shielding film as described in any one of [1] to [5], the mean value of angles formed between at least one interface of the metal particle-containing layer and the main plane of the hexagonal to circular tabular metal particles is 30° or less.

[7] Preferably, in the infrared ray shielding film as described in any one of [1] to [6], the main plane of the tabular metal particles is plane-oriented in a range of from 0° to ±30° on average relative to one surface of the metal particle-containing layer, the coefficient of variation of the circle-equivalent diameter of the tabular metal particle is 13% or more, and the RMS granularity of the tabular metal particles is 30 or less.

[8] Preferably, in the infrared ray shielding film as described in [7], the RMS granularity of the tabular metal particles is 25 or less.

[9] Preferably, in the infrared ray shielding film as described in [7], the RMS granularity of the tabular metal particles is 20 or less.

[10] Preferably, in the infrared ray shielding film as described in any one of [1] to [9], the coefficient of variation of the circle-equivalent diameter of the tabular metal particle is 20% or more.

[11] Preferably, in the infrared ray shielding film as described in any one of [1] to [10], the mean particle diameter of the tabular metal particles is from 70 nm to 500 nm, and the aspect ratio (mean particle diameter/mean particle thickness) of the tabular metal particles is from 8 to 40.

[12] Preferably, in the infrared ray shielding film as described in any one of [1] to [11], the visible light transmittance is 70% or more.

[13] Preferably, in the infrared ray shielding film as described in any one of [1] to [12], the thickness of at least one of the metal particle-containing layers is from 10 nm to 80 nm.

[14] Preferably, in the infrared ray shielding film as described in any one of [1] to [13], the hexagonal to circular tabular metal particles contain silver.

[15] Preferably, in the infrared ray shielding film as described in any one of [1] to [14], a UV absorbent is further contained.

[16] Preferably, in the infrared ray shielding film as described in any one of [1] to [15], an adhesive layer is farther contained, in which the UV absorbent is contained in the adhesive layer or a layer between the adhesive layer and the metal particle-containing layer.

[17] Preferably, in the infrared ray shielding film as described in any one of [1] to [16], the metal particle-containing layer having at least two absorption peaks or at least two reflection peaks in the region of 800 nm to 2000 nm is a layer in which the hexagonal to circular tabular metal particles and the metal oxide particles are mixed and dispersed in a binder.

[18] Preferably, in the infrared ray shielding film as described in any one of [1] to [17], at least one of each of a metal particle-containing layer having at least two absorption peaks or at least two reflection peaks in the region of 800 nm to 2000 nm, and a metal oxide-containing layer containing metal oxide is further contained.

[19] Preferably, in the infrared ray shielding film as described in any one of [1] to [18], out of wavelength bands at 800 nm to 2,000 nm, a wavelength band having a reflectance of 20% or more covers at least 800 nm width.

[20] Preferably, in the infrared ray shielding film as described in any one of [1] to [19], the metal particle-containing layer is arranged on at least one surface of a polymer film that is a substrate.

According to a first aspect of the present invention, infrared rays at a wide range (from 800 nm to 2000 nm) are reflected (heat ray reflection), and thus, a heat ray shielding film having little absorption (heat ray absorption) can be provided efficiently.

According to a second aspect of the present invention, a heat ray shielding material which has high visible light transmittance and mean solar reflectance, and is capable of reflecting infrared light over a wide band can be provided.

DESCRIPTION OF EMBODIMENTS

Figure 1A:
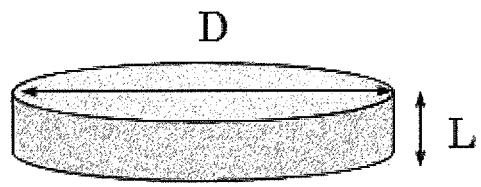
FIG. 1A is a schematic perspective view showing an example of the shape of the tabular particle contained in the infrared ray shielding film of the present invention, and shows circular tabular metal particles.

Hereinafter, the infrared ray shielding film of the present invention will be described in detail.

The description of the constitutive elements given hereinunder may be for typical embodiments of the present invention in some cases, to which, however, the present invention should not be limited. In this specification, the numerical value range expressed by the wording "(a number) to (another number)" means a range that falls between the former number indicating the lower limit of the range and the latter number indicating the upper limit thereof.

(Infrared Ray Shielding Film)

The infrared ray shielding film of the present invention has a metal particle-containing layer that contains at least one kind of metal particle, in which the metal particle has hexagonal to circular tabular metal particles in a proportion of 60% by number or more.

The infrared ray shielding film of the first aspect of the present invention has a metal particle-containing layer that contains at least one kind of metal particle, in which the metal particle has hexagonal to circular tabular metal particles in a proportion of 60% by number or more and at least one of the metal particle-containing layers has at least two absorption peaks or at least two reflection peaks in the region of 800 nm to 2000 nm. By adopting such a configuration, the infrared ray shielding film of the first aspect can reflect infrared rays at a wide range (from 800 nm to 2000 nm) (heat ray reflection) to reduce absorption (heat ray absorption).

The infrared ray shielding film of the second aspect of the present invention has a metal particle-containing layer that contains at least one kind of metal particle, in which the metal particle has hexagonal to circular tabular metal particles in a proportion of 60% by number or more, the main plane of the tabular metal particles is plane-oriented in a range of from 0° to ±30° on average relative to one surface of the metal particle-containing layer, the coefficient of variation of the circle-equivalent diameter of the tabular metal particle is 13% or more, and the RMS granularity of the tabular metal particles is 30 or less. Preferred is also an aspect of the heat ray shielding film of the second aspect of the present invention having a metal particle-containing layer that contains at least one kind of metal particle, which further has other layers such as an adhesive layer, a UV absorbent layer, a substrate, and a metal oxide particle-containing layer, if necessary.

As a layer configuration of the infrared ray shielding film of the present invention, there may be mentioned an aspect in which, as shown in FIGS. 2A to 2E, the infrared ray shielding film has a metal particle-containing layer 2 that contains at least one kind of metal particle and hexagonal to circular tabular metal particles 3 are unevenly distributed on the surface of the infrared ray shielding film. It is also preferable that the infrared ray shielding film of the present invention has a polymer layer 1 as a substrate.

Hereinafter, a preferred aspect of the infrared ray shielding film of the present invention will be described.

<1. Metal Particle-Containing Layer>

In the infrared ray shielding film of the first aspect of the present invention, the metal particle-containing layer may be suitably selected in accordance with the intended object thereof with no limitation, so far as the metal particle-containing layer is a layer that contains at least one kind of metal particle, the metal particle has hexagonal to circular tabular metal particles in a proportion of 60% by number or more, and at least one of the metal particle-containing layers has at least two absorption peaks or at least two reflection peaks in the region of 800 nm to 2000 nm.

In the infrared ray shielding film of the second aspect of the present invention, the metal particle-containing layer may be suitably selected in accordance with the intended object thereof with no limitation, so far as the metal particle-containing layer is a layer that contains at least one kind of metal particle, the metal particle has hexagonal to circular tabular metal particles in a proportion of 60% by number or more, the main plane of the tabular metal particles is plane-oriented in a range of from 0° to ±30° on average relative to one surface of the metal particle-containing layer, the coefficient of variation of the circle-equivalent diameter of the tabular metal particle is 13% or more, and the RMS granularity of the tabular metal particles is 30 or less.

(Optical Characteristics)

The infrared ray shielding film of the present invention preferably has at least one of the metal particle-containing layers and has at least two absorption peaks or at least two reflection peaks in the region of 800 nm to 2000 nm.

However, in this specification, the number of peaks in a reflectance spectrum refers to the number of times involving a change in the sign of the difference between the previous point and the latter point from a positive value to a negative value when the reflection spectrum obtained in an arbitrary measurement wavelength width is measured at every 5 nm at a measurement wavelength of 800 nm to 2000 nm, and the average of the measured values at five points including two points before and after the value is referred to as a value of the point.

Similarly, the number of peaks in an absorption spectrum refers to the number of times involving a change in the sign of the difference between the previous point and the latter point from a positive value to a negative value when the absorption spectrum obtained in an arbitrary measurement wavelength width is measured at every 5 nm at a measurement wavelength of 800 nm to 2000 nm, and the average of the measured values at five points including two points before and after the value is referred to as a value of the point.

In the infrared ray shielding film of the present invention, at least one of the metal particle-containing layers preferably has at least two transmission peaks in a region at 800 nm to 2000 nm.

Similarly, the number of peaks in a transmission spectrum refers to the number of times involving a change in the sign of the difference between the previous point and the latter point from a positive value to a negative value when the transmission spectrum obtained in an arbitrary measurement wavelength width is measured at every 5 nm at a measurement wavelength of 800 nm to 2000 nm, and the average of the measured values at five points including two points before and after the value is referred to as a value of the point.

In the infrared ray shielding film of the first aspect of the present invention, out of wavelength bands at 800 nm to 2,500 nm, a wavelength band having a reflectance of 20% or more covers preferably at least 600 nm width, more preferably at least 900 nm width, and particularly preferably at least 1200 nm width. In the heat ray shielding film of the second aspect of the present invention, out of wavelength bands at 800 nm to 2,500 nm, a wavelength band having a reflectance of 25% or more covers preferably at least 800 nm width, more preferably at least 1000 nm width, and particularly preferably at least 1200 nm width.

In the infrared ray shielding film of the present invention, the number of the peaks in the reflection spectrum, the number of the peaks in the absorption spectrum, and the number of the peaks in the transmission spectrum are each independently preferably 2.

By providing the infrared ray shielding film of the present invention with such a spectrum, the infrared light can be reflected (and/or absorbed) over a wide band.

The solar reflectance of the infrared ray shielding film of the present invention is preferably a maximum value in a range of from 800 nm to 2,500 nm (preferably from 800 nm to 1,800 nm), from the viewpoint of raising the efficiency in the heat ray reflectance.

The visible light transmittance of the infrared ray shielding film of the present invention is preferably 60% or more, and more preferably 70% or more. When the visible light transmittance is less than 60%, there are some cases where outside objects are hardly seen, for example, when used as glass for vehicles or glass for buildings.

The solar reflectance of the heat ray shielding film of the present invention is preferably 13% or more, more preferably 17% or more, and particularly preferably 20% or more.

The UV transmittance of the infrared ray shielding film of the present invention is preferably 5% or less, and more preferably 2% or less. When the UV transmittance is more than 5%, the color of the tabular metal particle layer may be changed by UV rays in the sunlight in some cases.

The haze of the infrared ray shielding film of the present invention is preferably 20% or less, more preferably 10% or less, and still more preferably 3% or less. When the haze is more than 20%, there are some cases where outside objects are hardly seen, for example, when used as glass for vehicles or glass for buildings, which is thus not preferably in terms of safety.

(RMS Granularity)

In one embodiment of the heat ray shielding film of the present invention, the RMS granularity of the tabular metal particles is 30 or less. As used in the present invention, the RMS granularity refers to the RMS granularity is obtained by extracting tabular metal particles by binarizing the electron microscope photos of the tabular metal particles and adjusting the aperture diameter to 0.6 µm square, with respect to in the silver salt photography described in "Revised Fundamentals of Photography Engineering—Silver Salt Photography—(Corona Publishing Co., Ltd., 1998)", P. 504. Further, RMS is an abbreviation of root mean(s) square.

A method for calculating the RMS granularity in the present invention includes:

(1) imaging the electron microscope photos of the tabular metal particles, (2) extracting the tabular metal particles by binarizing the photos, (3) obtaining an average of the concentrations with a mesh of 0.6 µm square, and (4) determining a coefficient of variation of the concentration of the mesh, which is referred to as an RMS granularity in the present invention.

In the heat ray shielding film of the present invention, the RMS granularity of the tabular metal particles is preferably 25 or less, and more preferably 20 or less. On the other hand, in the heat ray shielding film of the present invention, from the viewpoint of heat ray shielding, the RMS granularity of the tabular metal particles is preferably 1 or more, more preferably 2 or more, and particularly preferably 4 or more.

—1-1. Metal Particles—

The metal particles have hexagonal to circular tabular metal particles in a proportion of 60% by number or more.

When the thickness of the metal particle-containing layer is referred to as d, it is preferable that 80% by number or more of the hexagonal to circular tabular metal particles exist in the range of from the surface of the metal particle-containing layer to the depth of d/2 thereof, more preferably in the range of from the surface of the metal particle-containing layer to the depth of d/3 thereof. Not adhering to any theory, the heat ray shielding material of the present invention is not limited to one obtained by the production method as described below; however, the tabular metal particles may be unevenly distributed in one surface of the metal particle-containing layer by adding a specific polymer (preferably a latex) thereto in producing the metal particle-containing layer.

Regarding the existence form of the hexagonal to circular tabular metal particles in the metal particle-containing layer, the tabular metal particles are plane-oriented in a range of from 0° to ±30° on average relative to one surface of the metal particle-containing layer (in the case where the heat ray shielding film of the present invention has a substrate, the surface of the substrate).

Further, the one surface of the metal particle-containing layer is preferably a flat plane. In the case where the metal particle-containing layer of the infrared ray shielding film of the present invention has a substrate serving as a temporary support, it is preferable that both the surface of the metal particle-containing layer and the surface of the substrate be nearly horizontal surfaces. Here, the infrared ray shielding film may have or may not have the temporary support.

Not specifically defined, the size of the metal particles may be suitably selected in accordance with the intended object thereof. For example, the particles may have a mean particle diameter of 500 nm or less.

Also not specifically defined, the material of the metal particles may be suitably selected in accordance with the intended object thereof. From the viewpoint that the heat ray (near-IR ray) reflectance thereof is high, preferred are silver, gold, aluminum, copper, rhodium, nickel, platinum, or the like. More preferred is silver.

—1-2. Tabular Metal Particles—

Not specifically defined, the tabular metal particles may be suitably selected in accordance with the intended object thereof so far as they are particles each including two main planes (see FIGS. 1A and 1B), and examples thereof include hexagonal, circular, and triangular shapes. Of those, more preferred are hexagonal or more, polygonal to circular shapes from the viewpoint of high visible light transmittance thereof. Particularly preferred is a hexagonal or circular shape.

In this specification, the circular shape means such a shape that, in the tabular metal particles (the meaning thereof is the same as the meaning of tabular metal particles), the number of the sides thereof having a length of 50% or more of the mean circle-equivalent diameter is 0 (zero) per one tabular metal particle. The circular tabular metal particles are not specifically defined and may be suitably selected in accordance with the intended object thereof, so far as the particles have, when they are observed from the top of the main plane thereof with a transmission electronic microscope (TEM), no angle but have a roundish form.

In this specification, the hexagonal shape means such a shape that in the tabular metal particles, the number of the sides thereof having a length of 20% or more of the mean circle-equivalent diameter is 6 per one tabular metal particle. The same shall apply to the other polygonal shapes. The hexagonal tabular metal particles are not specifically defined and may be suitably selected in accordance with the intended object thereof, so far as the particles have, when the tabular metal particles are observed from the top of the main plane thereof with a transmission electronic microscope (TEM) or SEM, have a hexagonal shape. For example, the angle of the hexagonal shape of the particles may be an acute angle or a blunt angle. However, from the viewpoint of the ability of the particles to reduce visible light absorption, the angle is preferably a blunt angle. The degree of the bluntness of the angle is not specifically defined and may be suitably selected in accordance with the intended object thereof.

Not specifically defined, the tabular metal particles may be the same as that of the above-described metal particles and may be suitably selected in accordance with the intended object thereof. Preferably, the tabular metal particles contain at least silver.

Of the metal particles existing in the metal particle-containing layer, the proportion of the hexagonal to circular tabular metal particles is 60% by number or more to the total number of the metal particles, preferably 65% by number or more, and more preferably 70% by number or more. When the proportion of the hexagonal to circular tabular metal particles is less than 60% by number, the visible light transmittance of the layer may be lowered in some cases.

[1-2-1. Plane Orientation]

Preferably, the main plane of the hexagonal to circular tabular metal particles is plane-oriented in a range of from 0° to ±30° on average relative to one surface of the metal particle-containing layer (in the case where the infrared ray shielding film has a substrate, the surface of the substrate), more preferably in a range of from 0° to ±20° on average, particularly preferably in a range of from 0° to ±10° on average, and more particularly preferably in a range of from 0° to ±5° on average.

Figure 2A:
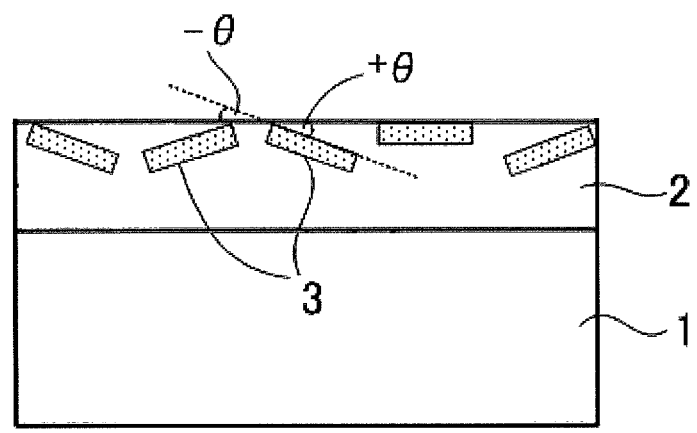
FIG. 2A is a schematic cross-sectional view showing the existence condition of a metal particle-containing layer that contains hexagonal to circular tabular metal particles in the infrared ray shielding film of the present invention, and explains the angle (θ) formed between the metal particle-containing layer that contains hexagonal to circular tabular metal particles (which is parallel to the plane of the substrate) and the main plane (that determines the circle-equivalent diameter D) of the hexagonal to circular tabular metal particles.
Figure 2B:
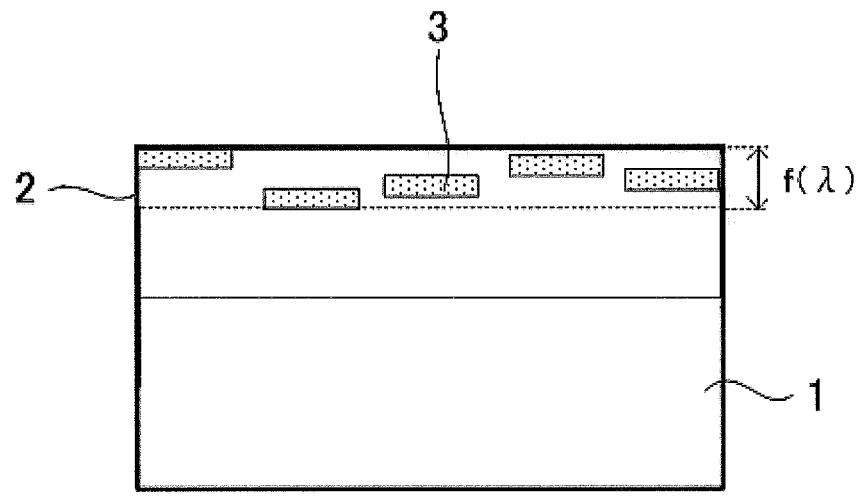
FIG. 2B is a schematic cross-sectional view showing the existence condition of a metal particle-containing layer that contains hexagonal to circular tabular metal particles in the infrared ray shielding film of the present invention, and shows the existence region of the tabular metal particles in the depth direction of the infrared ray shielding film in the metal particle-containing layer.
Figure 2C:
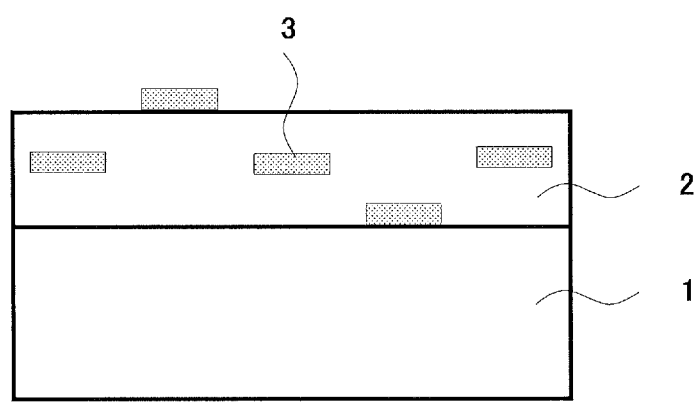
FIG. 2C is a schematic cross-sectional view showing an example of the existence condition of a metal particle-containing layer that contains hexagonal to circular tabular metal particles in the infrared ray shielding film in the present invention.
Figure 2D:
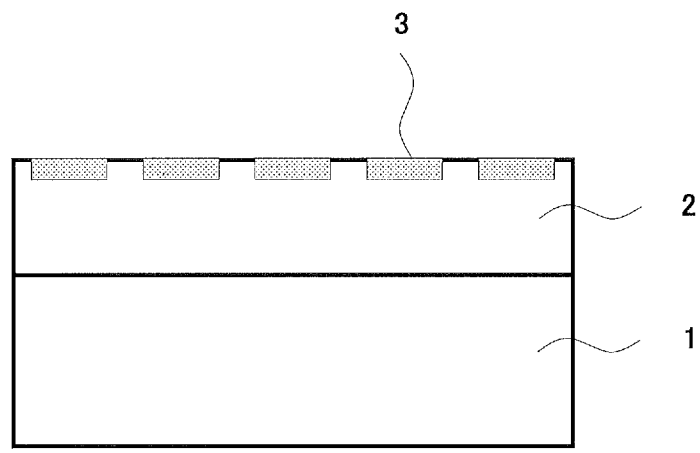
FIG. 2D is a schematic cross-sectional view showing another example of the existence condition of a metal particle-containing layer that contains hexagonal to circular tabular metal particles in the infrared ray shielding film in the present invention.
Figure 2E:
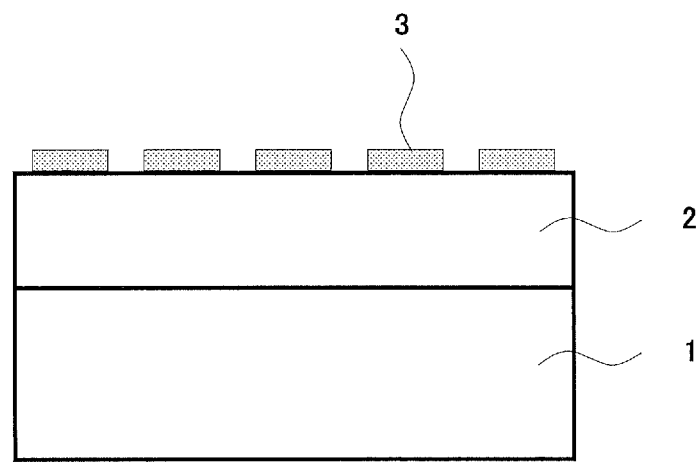
FIG. 2E is a schematic cross-sectional view showing still another example of the existence condition of a metal particle-containing layer that contains hexagonal to circular tabular metal particles in the infrared ray shielding film in the present invention.

Not specifically defined, the existence condition of the hexagonal to circular tabular metal particles may be suitably selected in accordance with the intended object thereof, but preferably, the particles are aligned as in FIG. 2D or FIG. 2E as described hereinunder.

Here, FIGS. 2A to 2E each are schematic cross-sectional views showing the existence condition of the metal particle-containing layer that contains tabular metal particles in the infrared ray shielding film of the present invention. FIG. 2A is a view explaining the angle (±θ) formed between the plane of the substrate 1 and the main plane (that determines the circle-equivalent diameter D) of the tabular metal particles 3. FIG. 2B shows the existence region in the depth direction of the infrared ray shielding film of the metal particle-containing layer 2. FIGS. 2C, 2D, and 2E show the existence condition of the tabular metal particles 3 in the metal particle-containing layer 2.

In FIG. 2A, the angle (±θ) between the surface of the substrate 1 and the main plane or the extended line of the main plane of the tabular metal particles 3 corresponds to the predetermined range in the above-described plane orientation. Specifically, the plane orientation means that the inclined angle (±θ) shown in FIG. 2A is small when the cross section of the infrared ray shielding film is observed, and in particular as in FIG. 2D, means that the surface of the substrate 1 is kept in contact with the main plane of the tabular metal particles 3, or that is, θ is 0°. When the angle of the plane orientation of the main plane of the tabular metal particles 3 relative to the surface of the substrate 1, or that is, θ shown in FIG. 2A is more than ±30°, the reflectance at a predetermined wavelength (for example, from the visible wavelength side to the near-infrared ray region) of the infrared ray shielding film is lowered.

Not specifically defined, the mode of evaluation of whether or not the main plane of the tabular metal particle is in plane orientation relative to one surface of the metal particle-containing layer (in the case where the heat ray shielding material has a substrate, the surface of the substrate) may be suitably selected in accordance with the object thereof. For example, in one evaluation method employable here, a suitable cross-sectional slice of the heat ray shielding material is prepared, and the metal particle-containing layer (in the case where the heat ray shielding material has a substrate, the substrate) and the tabular metal particles in the slice are observed and evaluated. Concretely, the heat ray shielding material is cut with a microtome or through focused ion beam technology (FIB) to prepare a cross-sectional sample or a cross-sectional slice sample, and this is observed with various types of microscopes (for example, field emission scanning electron microscope (FE-SEM) or the like), and the resulting image is evaluated.

In the heat ray shielding material, in the case where the binder to cover the tabular metal particles swells in water, the sample thereof that has been frozen with liquid nitrogen may be cut with a diamond cutter mounted on a microtome to prepare the cross-sectional sample or the cross-sectional slice sample. On the other hand, in the case where the binder to cover the tabular metal particles in the heat ray shielding material does not swell in water, the intended cross-sectional sample or cross-sectional slice sample may be prepared.

Not specifically defined, the cross-sectional sample or the cross-sectional slice sample prepared in the manner as above may be observed in any manner suitably selected in accordance with the intended object thereof so far as in the sample, and thus it is possible to confirm whether or not the main plane of the tabular metal particles could be in plane orientation relative to one surface of the metal particle-containing layer (in the case where the heat ray shielding material has a substrate, the surface of the substrate). Examples thereof include observations with FE-SEM, TEM, optical microscope, and the like. In the case of observation of the cross-sectional sample, the sample may be observed with FE-SEM, and in the case of the cross-sectional slice sample, the sample may be observed with TEM. In the case of evaluation with FE-SEM, it is preferable that the microscope has a spatial resolving power capable of clearly determining the shape of the tabular metal particles and the tilt angle (±θ in FIG. 5B) thereof.

[1-2-2. Mean Particle Diameter (Mean Circle-Equivalent Diameter) and Fluctuation Coefficient of Particle Size Distribution of Mean Particle Diameter (Mean Circle-Equivalent Diameter)]

Not specifically defined, the mean particle diameter (mean circle-equivalent diameter) of the tabular metal particles may be suitably selected in accordance with the intended object thereof. Preferably, the mean particle diameter is from 70 nm to 500 nm, and more preferably from 100 nm to 400 nm. When the mean particle diameter (mean circle-equivalent diameter) is less than 70 nm, the contribution of absorption by the tabular metal particles would be larger than that of reflection by the particles and therefore, the material could not secure sufficient heat ray reflectance; but when the mean particle diameter is more than 500 nm, the haze (scattering) would increase so that the transparency of the substrate may be deteriorated in some cases.

Here, the mean particle diameter (mean circle-equivalent diameter) means a mean value of the main plane diameters (maximum length) of 200 tabular particles that are randomly selected on the image taken in observation of the image with TEM.

The metal particle-containing layer may contain two or more different types of metal particles that differ in the mean particle diameter (mean circle-equivalent diameter) thereof; and in such a case, the metal particles may have two or more peaks of the mean particle diameter (mean circle-equivalent diameter) thereof.

Furthermore, the infrared ray shielding film of the present invention preferably includes at least two kinds of tabular metal particles, in which the metal particle-containing layer having at least two absorption peaks or at least two reflection peaks in the region of 800 nm to 2000 nm has tabular metal particles in a proportion of 60% by number or more, and the coefficient of variation of the circle-equivalent mean diameters is 35% or less.

Furthermore, preferably, in the infrared ray shielding film of the present invention, the metal particle-containing layer having at least two absorption peaks or at least two reflection peaks in the region of 800 nm to 2000 nm has hexagonal to circular tabular metal particles in a proportion of 60% by number or more, and the coefficient of variation of the circle-equivalent mean diameters of the hexagonal to circular tabular metal particles is 35% or less.

In the infrared ray shielding film of the first aspect of the present invention, the upper limit of the coefficient of variation of the particle size distribution of the tabular metal particles is preferably 35% or less, more preferably 33% or less, and particularly preferable 30% or less.

In the heat ray shielding film of the second aspect of the present invention, the coefficient of variation of the particle size distribution of the tabular metal particles is 13% or more, preferably 20% or more, more preferably more than 30%, and particularly preferably 40% or more. When the coefficient of variation is 13% or more, the heat ray reflection wavelength range of the heat ray shielding material may be broadened. Thus, infrared light can be reflected over a wide band, which is thus preferable. On the other hand, in the heat ray shielding film of the second aspect of the present invention, the upper limit of the coefficient of variation of the particle size distribution of the tabular metal particles is preferably 200% or less, more preferably 150% or less, and particularly preferably 100% or less.

Here, the coefficient of variation of the particle size distribution of the tabular metal particles is a value (%) calculated, for example, as follows. The distribution range of the particle diameter of 200 tabular metal particles that have been employed for calculation of the mean value as described above is plotted to determine a standard deviation of the particle size distribution, and this is divided by the mean value of the main plane diameter (maximum length) obtained as above (mean particle diameter (mean circle-equivalent diameter)) to give the intended value (%).

[1-2-3. Thickness and Aspect Ratio of Tabular Metal Particles]

Not specifically defined, the aspect ratio of the tabular metal particles may be suitably selected in accordance with the intended object thereof, and is preferably from 8 to 40, and more preferably from 10 to 35 from the viewpoint that the reflectance of the particles in an infrared ray region at a wavelength of from 800 nm to 2,000 nm could be high. When the aspect ratio is less than 8, the reflection wavelength would be shorter than 800 nm; and when the aspect ratio is more than 40, the reflection wavelength would be longer than 1,800 nm and thus, the material could not secure sufficient heat ray reflective performance.

Figure 1B:
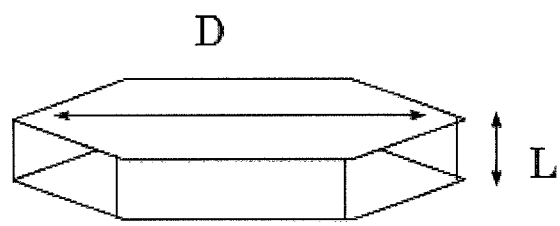
FIG. 1B is a schematic perspective view showing an example of the shape of the tabular particle contained in the infrared ray shielding film of the present invention, and shows hexagonal tabular metal particles.

The aspect ratio means a value calculated by dividing the mean particle diameter (mean circle-equivalent diameter) of the tabular metal particles by the mean particle thickness of the tabular metal particles. The mean particle thickness corresponds to the distance between the main planes of the tabular metal particles; and for example, as shown in FIGS. 1A and 1B, the mean particle thickness may be measured with an atomic force microscope (AFM).

Not specifically defined, the method of measuring the mean particle thickness with AFM may be suitably selected in accordance with the intended object thereof. Examples thereof include a method in which a particle dispersion that contains tabular metal particles is dropped onto a glass substrate and dried, and the thickness of one particle is measured.

In addition, the thickness of the tabular metal particle is preferably from 5 nm to 20 nm, and more preferably from 5 nm to 12 nm.

[1-2-4. Existence Region of Tabular Metal Particles]

Further, in the metal particle-containing layer, when the thickness of the metal particle-containing layer is referred to as d, preferably, 80% by number or more of the tabular metal particles exist in the range of from the surface to d/2, of the metal particle-containing layer, more preferably in the range to d/3; and even more preferably, 60% by number or more of the hexagonal to circular tabular metal particles are exposed out of one surface of the metal particle-containing layer. The tabular metal particles existing in the range of from the surface to d/2, of the metal particle-containing layer means that at least a part of the tabular metal particles are contained in the range of from the surface to d/2, of the metal particle-containing layer. In other words, the tabular metal particles that partly protrude out of the surface of the metal particle-containing layer, as in FIG. 2E, are also in the scope of the concept of the tabular metal particles existing in the range of from the surface to d/2, of the metal particle-containing layer. FIG. 2E means that only a part of each tabular metal particle is buried in the metal particle-containing layer in the thickness direction thereof but does not mean that each tabular metal particle is laid on the surface of the metal particle-containing layer.

In addition, the tabular metal particles that are exposed out of one surface of the metal particle-containing layer means that a part of one surface of the tabular metal particle protrudes out of the surface of the metal particle-containing layer. Not adhering to any theory, the infrared ray shielding film of the present invention is not limited to one obtained by the production method as described below; however, the tabular metal particles may be unevenly distributed in one surface of the metal particle-containing layer by adding a specific polymer (preferably a latex) thereto in producing the metal particle-containing layer.

Here, the existence distribution of the tabular metal particles in the metal particle-containing layer may be determined, for example, on the image taken through SEM observation of a cross-sectional sample of the infrared ray shielding film.

Not specifically defined, the plasmon resonance wavelength $\lambda$ of the metal that constitutes the tabular metal particles in the metal particle-containing layer may be suitably selected in accordance with the intended object thereof, but from the viewpoint of imparting heat ray reflection performance to the layer, the wavelength is preferably from 400 nm to 2,500 nm, and from the viewpoint of imparting visible light transmittance thereto, the wavelength is more preferably from 700 nm to 2,500 nm, and particularly preferably from 700 nm to 2,000 nm.

[1-2-5. Medium in Metal Particles-Containing Layer]

In the infrared ray shielding film of the present invention, the metal particle-containing layer preferably contains a polymer as a medium. By such a configuration, the adhesion between the metal particle-containing layer and the polymer film can be easily controlled to 2 points or less by a cross-cut Cellotape peeling test (registered trademark) as defined in JIS K5600-5-6.

Not specifically defined, the polymer may be suitably selected in accordance with the intended object thereof. Examples of the polymer include polymers, for example, a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, natural polymers such as gelatin and cellulose. Of those, the main polymer of the polymer is preferably a polyvinyl alcohol resin, a polyvinyl butyral resin, a polyvinyl chloride resin, a (saturated) polyester resin, or a polyurethane resin, and more preferred are a polyester resin and a polyurethane resin, from the viewpoint that 80% by number or more of the hexagonal to circular tabular metal particles could be readily made to exist in the range of from the surface to d/2, of the metal particle-containing layer; and even more preferred is a polyester resin from the viewpoint of further improving the cross-cut adhesion of the heat ray shielding material of the present invention.

Further, in this specification, the main polymer of the polymer contained in the metal particle-containing layer means a polymer component that accounts for 50% by mass or more of the polymer contained in the metal particle-containing layer.

In the infrared ray shielding film, the content of the polyester resin relative to the metal particles contained in the metal particle-containing layer is preferably from 1% by mass to 10000% by mass, more preferably from 10% by mass to 1000% by mass, and particularly preferably from 20% by mass to 500% by mass.

The refractive index n of the medium is preferably from 1.4 to 1.7.

In the infrared ray shielding film, when the thickness of the hexagonal to circular tabular metal particles is referred to as a, 80% by number or more of the hexagonal to circular tabular metal particles are preferably covered with the polymer in the range of at least a/10 in the thickness direction thereof, more preferably covered with the polymer in the range of from a/10 to 10a in the thickness direction thereof, and particularly preferably covered with the polymer in the range of from a/8 to 4a. When at least a predetermined proportion of the hexagonal to circular tabular metal particles are buried in the metal particle-containing layer in the manner as above, the scratch resistance of the layer could be further enhanced. Specifically, regarding the infrared ray shielding film, the embodiment of FIG. 2D is preferred to the embodiment of FIG. 2E.

[1-2-6. Areal Ratio of Tabular Metal Particles]

The areal ratio [(B/A)×100] that is the ratio of the total area B of the tabular metal particles to the area A of the substrate when the infrared ray shielding film of the first aspect of the present invention is seen from the top thereof (the total projected area A of the metal particle-containing layer when the metal particle-containing layer is seen in the vertical direction thereof) is preferably from 10% to less than 60%, more preferably from 20% to less than 60%, and particularly preferably from 30% to less than 50%. When the areal ratio is less than 10%, the maximum heat ray reflectance of the material may be lowered and the heat shielding effect may not be sufficiently obtained in some cases.

The areal ratio [(B/A)×100] that is the ratio of the total area B of the tabular metal particles to the area A of the substrate when the infrared ray shielding film of the second aspect of the present invention is seen from the top thereof (the total projected area A of the metal particle-containing layer when the metal particle-containing layer is seen in the vertical direction thereof) is preferably 15% or more, and more preferably 20% or more. When the areal ratio is less than 15%, the maximum heat ray reflectance of the material may be lowered and the heat shielding effect may not be sufficiently obtained in some cases.

Here, the areal ratio may be measured, for example, by processing the image taken through SEM observation of the infrared ray shielding film from the top thereof or the image taken through AFM (atomic force microscope) observation thereof.

[1-2-7. Mean Intergranular Distance of Tabular Metal Particles]

The mean intergranular distance of the tabular metal particles that are adjacent to each other in the horizontal direction in the metal particle-containing layer is preferably 1/10 or more of the mean particle diameter of the tabular metal particles from the viewpoint of the visible light transmittance and the maximum heat ray reflectance of the layer.

When the mean intergranular distance in the horizontal direction of the tabular metal particles is less than 1/10 of mean particle diameter of the tabular metal particles, the maximum heat ray reflectance of the layer is lowered. The mean intergranular distance in the horizontal direction is preferably at random from the viewpoint of the visible light transmittance of the layer. When the distance is not at random, or that is, when the distance is uniform, there may occur visible light absorption and the visible light transmittance may be lowered in some cases.

Here, the mean intergranular distance in the horizontal direction of the tabular metal particles means a mean value of the intergranular distances of two adjacent particles. The mean intergranular distance that is at random means that "when a SEM image containing 100 or more tabular metal particles is binarized to provide a two-dimensional autocorrelation of the brightness value, the result does not have any other significant maximum point than the point of origin".

[1-2-8. Layer Configuration of Metal Particles-Containing Layer]

In the infrared ray shielding film of the present invention, the tabular metal particles are arranged in the form of the metal particle-containing layer that contains the tabular metal particles, as in FIGS. 2A to 2E.

The metal particle-containing layer may be composed of a single layer as in FIGS. 2A to 2E, or may be composed of multiple metal particle-containing layers. In the case where the metal particle-containing layer is composed of multiple layers, it may be given any desired heat shieldability in accordance with the wavelength range in which the heat shieldability is desired to be given to the layer. In the case where the metal particle-containing layer is composed of multiple layers, it is preferable that, at least in the outermost metal particle-containing layer, when the thickness of the outermost metal particle-containing layer is referred to as d', 80% by number or more of the hexagonal to circular tabular metal particles exist in the range of from the surface to d'/2, of the outermost metal particle-containing layer.

[1-2-9. Thickness of Metal Particles-Containing Layer]

In the infrared ray shielding film of the first aspect of the present invention, the thickness of at least one of the metal particle-containing layers is from 10 nm to 80 nm, more preferably from 20 nm to 80 nm, and particularly preferably from 20 nm to 75 nm. In the infrared ray shielding film of the second aspect of the present invention, the thickness of the metal particle-containing layer is preferably from 10 nm to 160 nm, and more preferably from 20 nm to 80 nm. When the thickness of the hexagonal to circular tabular metal particles is referred to as a, the thickness d of the metal particle-containing layer is preferably from a to 10a, and more preferably from 2a to 8a. As for the thickness of the metal particle-containing layer, it is particularly preferable that the total thickness of all the metal particle-containing layers be within the above range.

Here, the thickness of each metal particle-containing layer may be determined, for example, on the image taken through SEM observation of a cross-sectional sample of the infrared ray shielding film.

Furthermore, in the case where any other layer, for example, an overcoat layer as described below is arranged on the metal particle-containing layer of the infrared ray shielding film, the boundary between the other layer and the metal particle-containing layer may be determined in the same manner as above, and the thickness d of the metal particle-containing layer may also be determined in the same manner as above. In the case where the same type of polymer as that of the polymer contained in the metal particle-containing layer is used to form a coating film on the metal particle-containing layer, in general, the boundary between the metal particle-containing layer and the coating film could be determined on the image taken through SEM observation, and the thickness d of the metal particle-containing layer could be thereby determined.

[1-2-10. Method for Synthesis of Tabular Metal Particles]

Not specifically defined, the method for synthesizing the tabular metal particles may be suitably selected in accordance with the intended object thereof so far as the intended hexagonal to circular tabular metal particles could be synthesized in the method. Examples thereof include a liquid-phase method such as a chemical reduction method, an optochemical reduction method, an electrochemical reduction method or the like. Of those, especially preferred is a liquid-phase method such as a chemical reduction method, an optochemical reduction method or the like, from the viewpoint of the form and size controllability thereof. After hexagonal to triangular tabular metal particles have been synthesized, the particles may be etched with a dissolution species capable of dissolving silver, such as nitric acid, sodium nitrite or the like, then aged by heating or the like to thereby blunt the corners of the hexagonal to triangular tabular metal particles to give the intended hexagonal to circular tabular metal particles.

Regarding any other method of synthesizing the tabular metal particles than the above, a seed crystal may be fixed on the surface of a transparent substrate such as a film, glass or the like, and then tabular metal particles (for example, Ag) may be grown crystal-like thereon.

In the infrared ray shielding film of the present invention, the tabular metal particles may be further processed so as to be given desired characteristics. Not specifically defined, the additional treatment may be suitably selected in accordance with the intended object thereof. Examples thereof include formation of a high-refractivity shell layer, and addition of various additives such as a dispersant and an antioxidant.

—1-2-10-1. Formation of High-Refractivity Shell Layer—

The tabular metal particles may be coated with a high-refractivity material having a high visible light transparency for the purpose of further increasing the visible light transparency thereof.

Not specifically defined, the high-refractivity material may be suitably selected in accordance with the object thereof. Examples thereof include $TiO_x$, $BaTiO_3$, $ZnO$, $SnO_2$, $ZrO_2$, and $NbO_x$.

Not specifically defined, the coating method may be suitably selected in accordance with the intended object thereof. For example, employable here is a method of hydrolyzing tetrabutoxytitanium to form a $TiO_x$ layer on the surface of the tabular metal particles of silver, as so reported by Langmuir, 2000, Vol. 16, p. 2731-2735.

Furthermore, in the case where a high-refractivity metal oxide layer shell is difficult to form directly on the tabular metal particles, another method may be employable here, in which the tabular metal particles have been synthesized in the manner as described above, a shell layer of $SiO_2$ or a polymer is suitably formed thereon, and further, the above-described metal oxide layer is formed on the shell layer. In the case where $TiO_x$ is used as a material of the high-refractivity metal oxide layer, $TiO_x$ having a photocatalyst activity may deteriorate the matrix in which the tabular metal particles are to be dispersed, and in such a case, therefore, an $SiO_2$ layer may be optionally formed in accordance with the intended object thereof, after the $TiO_x$ layer has been formed on the tabular metal particles.

—1-2-10-2. Addition of Various Additives—

In the infrared ray shielding film of the present invention, the tabular metal particles may have, as adsorbed thereon, an antioxidant such as mercaptotetrazole, ascorbic acid or the like for the purpose of preventing the metal such as silver constituting the tabular metal particles from being oxidized. In addition, also for preventing oxidation, an oxidation sacrifice layer of Ni or the like may be formed on the surface of the tabular metal particles. For shielding them from oxygen, the particles may be coated with a metal oxide film of $SiO_2$ or the like.

For imparting dispersibility to the tabular metal particles, for example, a low-molecular-weight dispersant, a high-molecular-weight dispersant or the like that contains at least any of N element, S element and P element, such as quaternary ammonium salts, amines or the like may be added to the tabular metal particles.

<<2. Substrate>>

The infrared ray shielding film of the present invention preferably has a polymer film as a substrate and the adhesion between the metal particle-containing layer and the polymer preferably has 2 or less points in a cross-cut Cellotape peeling test (registered trademark) as defined in JIS K5600-5-6.

Preferably, the infrared ray shielding film has a substrate on the side thereof opposite to the side of the surface of the metal particle-containing layer therein in which 80% by number or more of hexagonal to circular tabular metal particles are unevenly distributed.

Not specifically defined, the substrate may be any optically transparent substrate, and may be suitably selected in accordance with the intended object thereof. Examples thereof include one having a visible light transmittance of 70% or more, preferably 80% or more, and one having a high near-infrared ray transmittance.

The substrate is not specifically defined in point of the shape, structure, size, material and others thereof so far as it is a polymer film, and may be suitably selected in accordance with the intended object thereof. The shape may be tabular or the like; the structure may be a single-layer structure or a laminate layer structure; and the size may be suitably selected in accordance with the size of the infrared ray shielding film.

Not specifically defined so far as the material of the substrate used in the infrared ray shielding film of the present invention is a polymer film, it may be suitably selected from various transparent polymer films in accordance with the situations. Examples of the transparent polymer film include films formed of a polyolefin-based resin such as polyethylene, polypropylene, poly-4-methyl-pentene-1, and polybutene-1; a polyester-based resin such as polyethylene terephthalate, and polyethylene naphthalate; a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin, a cellulose resin such as cellulose acetate; as well as laminate films formed of such films. Of those, a polyethylene terephthalate film is particularly suitable.

Not specifically defined, the thickness of the substrate film may be suitably selected in accordance with the intended use object of the solar shielding film. The thickness is usually from about 10 µm to 500 µm, preferably from 12 µm to 300 µm, and more preferably from 16 µm to 125 µm.

<3. Other Layers>

<<3-1. Adhesive Layer>>

Preferably, the infrared ray shielding film of the present invention has an adhesive layer. The adhesive layer may contain a UV absorbent.

Not specifically defined, the material usable for forming the adhesive layer may be suitably selected in accordance with the intended object thereof, and examples thereof include a polyvinyl butyral (PVB) resin, an acrylic resin, a styrene/acrylic resin, a urethane resin, a polyester resin, and a silicone resin. These may be used singly or in combination of two or more kinds thereof. The adhesive layer including the material may be formed by coating.

Further, an antistatic agent, a lubricant agent, an anti-blocking agent, or the like may be added to the adhesive layer.

The thickness of the adhesive layer is preferably from 0.1 µm to 30 µm.

<<3-2. Hard Coat Layer>>

For imparting scratch resistance thereto, preferably, the functional film has a hard coat layer that has a function of hard coatability. The hard coat layer may contain metal oxide particles.

Not specifically defined, the hard coat layer may be suitably selected in point of the type thereof and the formation method for the layer, in accordance with the intended object thereof. Examples thereof include thermosetting or thermocurable resins such as an acrylic-based resin, a silicone-based resin, a melamine-based resin, a urethane-based resin, an alkyd-based resin, and a fluororesin. Not specifically defined, the thickness of the hard coat layer may be suitably selected in accordance with the intended object thereof. Preferably, the thickness is from 1 µm to 50 µm. Further forming an antireflection layer and/or an antiglare layer on the hard coat layer is preferred, since a functional film having an antireflection property and/or an antiglare property in addition to scratch resistance may be obtained. The hard coat layer may contain the above-described metal oxide particles.

<<3-3. Overcoat Layer>>

The infrared ray shielding film of the present invention may have an overcoat layer that is kept in direct contact with the surface of the metal particle-containing layers on which the hexagonal to circular tabular metal particles are kept exposed out, for the purpose of preventing oxidation and sulfurization of the tabular metal particles therein through mass transfer and for the purpose of imparting scratch resistance to the material. The material may have an overcoat layer between the metal particle-containing layer and the UV absorbent layer as described hereinunder. In the case where the tabular metal particles are unevenly distributed in the surface of the metal particle-containing layer in the infrared ray shielding film of the present invention, the material may have such an overcoat layer for the purpose of preventing the tabular metal particles from peeling away in the production step to cause contamination, and for the purpose of preventing the configuration of the tabular metal particles being disordered in forming any other layer on the metal particle-containing layer.

The overcoat layer may contain a UV absorbent.

Not specifically defined, the overcoat layer may be suitably selected in accordance with the intended object thereof. For example, the layer contains a binder, a mat agent and a surfactant, and may optionally contain any other component.

Not specifically defined, the binder may be suitably selected in accordance with the intended object thereof. Examples thereof include thermosetting or thermocurable resins such as an acrylic resin, a silicone-based resin, a melamine-based resin, a urethane-based resin, an alkyd-based resin, and a fluororesin.

The thickness of the overcoat layer is preferably from 0.01 µm to 1,000 µm, more preferably from 0.02 µm to 500 µm, particularly preferably from 0.1 to 10 µm, and more particularly preferably from 0.2 to 5 µm.

<<3-4. UV Absorbent>>

The layer containing a UV absorbent may be suitably selected in accordance with the intended object thereof, and may be an adhesive layer, or a layer between the adhesive layer and the metal particle-containing layer (for example, an overcoat layer or the like). In any case, it is preferable that the UV absorbent be added to the layer to be arranged on the side to be exposed to sunlight relative to the metal particle-containing layer.

Not specifically defined, the UV absorbent may be suitably selected in accordance with the intended object thereof. Examples thereof include a benzophenone-based UV absorbent, a benzotriazole-based UV absorbent, a triazine-based UV absorbent, an salicylate-based UV absorbent, and a cyanoacrylate-based UV absorbent. These may be used singly or in combination of two or more kinds thereof.

Not specifically defined, the benzophenone-based UV absorbent may be suitably selected in accordance with the intended object thereof. Examples thereof include 2,4-dihydroxy-4-methoxy-5-sulfobenzophenone.

Not specifically defined, the benzotriazole-based UV absorbent may be suitably selected in accordance with the intended object thereof. Examples thereof include 2-(5-chloro-2H-benzotriazol-2-yl)-4-methyl-6-tert-butylphenol (Tinuvin 326), 2-(2-hydroxy-5-methylphenyl)benzotriazole, 2-(2-hydroxy-5-tertiary butylphenyl)benzotriazole, and 2-(2-hydroxy-3,5-di-tertiary butylphenyl)-5-chlorobenzotriazole.

Not specifically defined, the triazine-based UV absorbent may be suitably selected in accordance with the intended object thereof. Examples thereof include mono(hydroxyphenyl)triazine compounds, bis(hydroxyphenyl)triazine compounds, and tris(hydroxyphenyl)triazine compounds.

Examples of the mono(hydroxyphenyl)triazine compound include 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, 2-(2-hydroxy-4-isooctyloxyphenyl)-4,6-bis(2,4-dimethylphenyl)-1,3,5-triazine, and 2-(2-hydroxy-4-dodecyloxyphenyl)-4,6-bis(2,4-dimethylphenyl)-1,3,5-triazine. Examples of the bis(hydroxyphenyl)triazine compound include 2,4-bis(2-hydroxy-4-propyloxyphenyl)-6-(2,4-dimethylphenyl)-1,3,5-triazine, 2,4-bis(2-hydroxy-3-methyl-4-propyloxyphenyl)-6-(4-methylphenyl)-1,3,5-triazine, 2,4-bis(2-hydroxy-3-methyl-4-hexyloxyphenyl)-6-(2,4-dimethylphenyl)-1,3,5-triazine, and 2-phenyl-4,6-bis[2-hydroxy-4-[3-(methoxyheptaethoxy)-2-hydroxypropyloxy]phenyl]-1,3,5-triazine. Examples of the tris(hydroxyphenyl)triazine compound include 2,4-bis(2-hydroxy-4-butoxyphenyl)-6-(2,4-dibutoxyphenyl)-1,3,5-triazine, 2,4,6-tris(2-hydroxy-4-octyloxyphenyl)-1,3,5-triazine, 2,4,6-tris[2-hydroxy-4-(3-butoxy-2-hydroxypropyloxy)phenyl]-1,3,5-triazine, 2,4-bis[2-hydroxy-4-[1-(isooctyloxycarbonyl)ethoxy]phenyl]-6-(2,4-dihydroxyphenyl)-1,3,5-triazine, 2,4,6-tris[2-hydroxy-4-[1-(isooctyloxycarbonyl)ethoxy]phenyl]-1,3,5-triazine, and 2,4-bis[2-hydroxy-4-[1-(isooctyloxycarbonyl)ethoxy]phenyl]-6-[2,4-bis[1-(isooctyloxycarbonyl)ethoxy]phenyl-1,3,5-triazine.

Not specifically defined, the salicylate-based UV absorbent may be suitably selected in accordance with the intended object thereof. Examples thereof include phenyl salicylate, p-tert-butylphenyl salicylate, p-octylphenyl salicylate, and 2-ethylhexyl salicylate.

Not specifically defined, the cyanoacrylate-based UV absorbent may be suitably selected in accordance with the intended object thereof. Examples thereof include 2-ethylhexyl-2-cyano-3,3-diphenyl acrylate and ethyl-2-cyano-3,3-diphenyl acrylate.

Not specifically defined, the binder may be suitably selected in accordance with the intended object thereof, but is preferably one having high visible light transparency and solar transparency. Examples thereof include acrylic resin, polyvinyl butyral, and polyvinyl alcohol. When the binder absorbs heat rays, the reflection effect of the tabular metal particles may be thereby weakened, and therefore, it is preferable that, for the UV absorbent layer to be formed between a heat ray source and the tabular metal particles, a material not having an absorption in the region of from 450 nm to 1,500 nm is selected and the thickness of the UV absorbent layer is reduced.

The thickness of the UV absorbent layer is preferably from 0.01 μm to 1,000 μm, and more preferably from 0.02 μm to 500 μm. When the thickness is less than 0.01 μm, the UV absorption would be poor; and when the thickness is more than 1,000 μm, the visible light transmittance may be lowered in some cases.

The content of the UV absorbent layer varies, depending on the UV absorbent layer to be used, and therefore could not be indiscriminately defined. Preferably, the content is suitably defined so as to give a desired UV transmittance to the infrared ray shielding film of the present invention.

The UV transmittance is preferably 5% or less, and more preferably 2% or less. When the UV transmittance is more than 5%, the color of the tabular metal particle-containing layer would be changed by the UV ray of sunlight.

<<3-5. Metal Oxide Particles>>

In order to absorb long-wave infrared rays, it is preferable that the infrared ray shielding film of the present invention optionally contain at least one kind of metal oxide particles, from the viewpoint of the balance between the heat ray shieldability and the production cost. In the infrared ray shielding film of the present invention, the metal particle-containing layer having at least two absorption peaks or at least two reflection peaks in the region of 800 nm to 2000 nm is preferably a layer in which tabular metal particles and the metal oxide particles are mixed and dispersed in a binder. On the other hand, the infrared ray shielding film of the present invention preferably includes at least one of each of a metal oxide-containing layer having at least two absorption peaks or at least two reflection peaks in the region of 800 nm to 2000 nm, and a metal oxide-containing layer containing metal oxide. Further, the infrared ray shielding film of the present invention preferably has the metal oxide particle-containing layer on the side thereof opposite to the side of the surface of the metal particle-containing layer therein in which the hexagonal to circular tabular metal particles of the metal particle-containing layer are exposed. In this case, for example, it is preferable that the overcoat layer contain metal oxide particles. The overcoat layer may be laminated on the metal oxide particle-containing layer via the substrate. In the case where the infrared ray shielding film of the present invention is configured so that the tabular metal particle-containing layer could be on the side to receive heat rays such as sunlight, the tabular metal particle-containing layer could reflect a part (or optionally all) of the heat rays given thereto may be reflected and the overcoat layer could absorb a part of the heat rays, and as a result, the heat quantity as a total of the heat quantity which the infrared ray shielding film directly receives inside it owing to the heat rays not absorbed by the metal oxide particle-containing layer but having run into the infrared ray shielding film and the heat quantity absorbed by the metal oxide particle-containing layer of the infrared ray shielding film and indirectly transferred to the inside of the infrared ray shielding film could be thereby reduced. That is, by providing a metal oxide-containing layer, a heat ray shielding film having a small absorption (heat ray absorption) of infrared rays at a wide range (from 800 nm to 2000 nm) can be provided.

Not specifically defined, the material for the metal oxide particles may be suitably selected in accordance with the intended object thereof. Examples thereof include tin-doped indium oxide (hereinafter abbreviated as "ITO"), tin-doped antimony oxide (hereinafter abbreviated as "ATO"), zinc oxide, titanium oxide, indium oxide, tin oxide, antimony oxide, and glass ceramics. Of those, more preferred are ITO, ATO, and zinc oxide since these have an excellent heat ray absorbability and capable of producing an infrared ray shielding film having a broad-range heat ray absorbability when combined with the tabular metal particles. Especially preferred is ITO as capable of blocking 90% or more of infrared rays of 1,200 nm or more and having a visible light transmittance of 90% or more.

Preferably, the volume-mean particle diameter of the primary particles of the metal oxide particles is 0.1 µm or less in order not to lower the visible light transmittance of the particles.

Not specifically defined, the shape of the metal oxide particles may be suitably selected in accordance with the intended object thereof. Examples of the shape of the particle include spherical, needle-like, and tabular shapes.

Not specifically defined, the content of the metal oxide particles in the metal oxide particle-containing layer may be suitably selected in accordance with the intended object thereof. For example, the content is preferably from 0.1 g/m$^2$ to 20 g/m$^2$, more preferably from 0.5 g/m$^2$ to 10 g/m$^2$, and even more preferably from 1.0 g/m$^2$ to 4.0 g/m$^2$.

When the content is less than 0.1 g/m$^2$, the amount of sunshine which could be felt on skin may increase; and when the content is more than 20 g/m$^2$, the visible light transmittance of the layer may be worsened in some cases. On the other hand, when the content is from 1.0 g/m$^2$ to 4.0 g/m$^2$, it is advantageous since the above two problems could be overcome.

Further, the content of the metal oxide particles in the metal oxide particle-containing layer may be determined, for example, as follows. The TEM image of an ultra-thin section of the heat ray shielding layer and the SEM image of the surface thereof are observed, the number of the metal oxide particles in a given area and the mean particle diameter thereof are measured, and the mass (g) calculated on the basis of the number and the mean particle diameter thereof and the specific gravity of the metal oxide particles is divided by the given area (m$^2$) to give the content. Alternatively, the content can also be calculated by dissolving the metal oxide fine particles in a given area of the metal oxide particle-containing layer in methanol, measuring the mass (g) of the metal oxide particles through fluorescent X-ray determination, and divided the mass (g) by the given area (m$^2$).

<4. Method for Producing Infrared Ray Shielding Film>

Not specifically defined, the method for producing the infrared ray shielding film of the present invention may be suitably selected in accordance with the intended object thereof. Examples thereof include a coating method of forming the above-described metal particle-containing layer, the above-described UV absorbent layer and optionally other layers on the surface of the above-described substrate.

—4-1. Method for Forming Metal Particles-Containing Layer—

Not specifically defined, the method for forming the metal particle-containing layer of the present invention may be suitably selected in accordance with the intended object thereof. Examples thereof include a method of applying a dispersion containing the above-described tabular metal particles onto the surface of the under layer such as the above-described substrate by coating with a dip coater, a die coater, a slit coater, a bar coater, a gravure coater, or the like, and a method of plane orientation according to an LB membrane method, a self-assembly method, a spray coating method, or the like. In producing the infrared ray shielding film of the present invention, a composition of the metal particle-containing layer as shown in Examples to be given hereinunder is prepared, and then a latex or the like is added thereto in order that 80% by number or more of the above-described hexagonal to circular tabular metal particles could exist in the range of from the surface of the metal particle-containing layer to d/2 thereof. Preferably, 80% by number or more of the above-described hexagonal to circular tabular metal particles exist in the range of from the surface of the metal particle-containing layer to d/3 thereof. The amount of the latex to be added is not specifically defined. For example, the latex is added in an amount of preferably from 1% by mass to 10000% by mass, more preferably from 10% by mass to 1000% by mass, and particularly preferably from 20% by mass to 500% by mass, relative to the tabular metal particles.

In addition, the plane orientation of the tabular metal particles may be promoted by passing through a pressure roller, such as a calendar roller, a lamination roller, or the like after the coating.

In the present invention, a method for controlling at least one of the metal particle-containing layers to have at least two absorption peaks or at least two reflection peaks in the region of 800 nm to 2000 nm, or a method for controlling the coefficient of variation of the mean particle diameter (mean circle-equivalent diameter) of the obtained infrared ray shielding material is not specifically defined. The shape of the tabular metal particle contained in the dispersion having tabular metal particles may be controlled so as to increase the coefficient of variation of the mean particle diameter (mean circle-equivalent diameter), or may be controlled by mixing two or more kinds of dispersions having tabular metal particles having small coefficient of variations of the mean particle diameter (mean circle-equivalent diameter).

In the present invention, in the case where the metal particle-containing layer contains two or more kinds of metal particles having different mean particle diameters (mean circle-equivalent diameters), a metal particle-containing layer is preferably formed by a using two or more kinds of metal particle dispersions having a small coefficient of variation of the mean particle diameter (mean circle-equivalent diameter) satisfying the circle-equivalent diameter to some degrees, which is prepared in such a way that the number of peaks of the mean particle diameters (mean circle-equivalent diameters) of the metal particle dispersions may be two or more. By adopting such a configuration, the spectrum can be easily controlled to have two absorption peak or at least two reflection peak, and the infrared light can be easily shielded over a wide band, which is thus preferable.

Specifically, from the viewpoint of having two peaks in the reflection spectrum and/or absorption spectrum, the difference in the mean particle diameters (mean circle-equivalent diameters) varies from 50 nm to 300 nm, and also, two or more kinds of metal particles having a coefficient of variation of the mean particle diameter (mean circle-equivalent diameter) with the above-described preferred ranges are preferably contained, and the difference in the mean particle diameter (mean circle-equivalent diameter) more preferably varies from 100 nm to 300 nm.

On the other hand, the heat ray shielding film of the second aspect of the present invention, in the case where the metal particle-containing layer contains one kind of metal particle having a mean particle diameter (mean circle-equivalent diameter), a metal particle-containing layer, which is prepared in such a way that the coefficient of variation of the mean particle diameter (mean circle-equivalent diameter) is increased (not satisfying the circle-equivalent diameter to some degrees), is preferably formed. By adopting such a configuration, the infrared light can be easily shielded over a wide band, which is thus preferable.

—4-2. Method for Forming Overcoat Layer—

Preferably, the overcoat layer is formed by coating. The coating method is not specifically defined, for which is employable by any known method. Examples thereof include a method of coating with a dispersion that contains the above-described UV absorbent by the use of a dip coater, a die coater, a slit coater, a bar coater, a gravure coater, or the like.

—4-3. Method for Forming Hard Coat Layer—

Preferably, the hard coat layer is formed by coating. The coating method is not specifically defined, for which is employable by any known method. Examples thereof include a method of coating with a dispersion that contains the above-described UV absorbent by the use of a dip coater, a die coater, a slit coater, a bar coater, a gravure coater, or the like.

—4-4. Method for Forming Adhesive Layer—

Preferably, the adhesive layer is formed by coating. For example, the adhesive layer may be laminated on the surface of the under layer such as the above-described substrate, the above-described metal particle-containing layer, the above-described UV absorbent layer or the like. The coating method is not specifically defined, for which is employable by any known method.

—4-5. Lamination of Adhesive Layer by Dry Lamination—

In the case where the infrared ray shielding film of the present invention is used for imparting functionality to existing windowpanes, the film may be stuck to the indoor side of the windowpanes by laminating thereon via an adhesive. In such a case, it is preferable that the reflection layer is made to face the sunlight side as much as possible because the heat generation could be prevented, and therefore it is suitable that an adhesive layer is laminated on the metal particle-containing layer and the material is stuck to a windowpane via the adhesive layer.

In laminating the adhesive layer onto the surface of the metal particle-containing layer, an adhesive-containing liquid may be directly coated onto the surface thereof; however, various additives contained in the adhesive as well as the plasticizer and the solvent used may disturb the alignment of the metal particle-containing layer or may deteriorate the metal particles themselves in some cases. To minimize such problems, it would be effective to employ dry lamination in which an adhesive is previously coated onto a release film and dried thereon to prepare an adhesive film, and the adhesive surface of the resulting film is laminated to the surface of the metal particle-containing layer of the infrared ray shielding film of the present invention.

[Laminate Structure]

A laminate structure can be produced by laminating the infrared ray shielding film of the present invention with any of glass or plastic.

Not specifically defined, a method for producing the laminate structure may be suitably selected in accordance with the intended object thereof. Examples thereof include a method of sticking the infrared ray shielding film as produced in the manner as above to glass or plastic for vehicles such as automobiles or the like, or to glass or plastic for buildings.

[Aspect of Use of Infrared Ray Shielding Film and Laminate Structure]

The infrared ray shielding film of the present invention may be used in any mode of selectively reflecting or absorbing heat rays (near infrared rays), and not specifically defined, the mode of using the material may be suitably selected in accordance with the intended object thereof. Examples thereof include a film or a laminate structure for vehicles, a film or a laminate structure for buildings, a film for agricultural use, etc. Of those, preferred are a film or laminate structure for vehicles and a film or laminate structure for buildings, from the viewpoint of the energy-saving effect thereof.

In addition, in the present invention, the heat rays (near-infrared rays) mean near-infrared rays (from 780 nm to 1,800 nm) that are contained in a proportion of about 50% in sunlight.

EXAMPLES

Hereinafter, the characteristics of the present invention will be described in detail with reference to Examples.

The materials, the amounts and proportions thereof, the details of the treatment, and the treatment procedure shown in the following Examples may be suitably modified or changed while not departing from the spirit of the present invention. Accordingly, the scope of the present invention should not be limitatively interpreted by the Examples mentioned below.

Comparative Example 1

—Synthesis of Tabular Metal Particles—

25 mL of a 8 g/L aqueous polystyrenesulfonic acid solution was added to 500 mL of a 2.5 mM aqueous sodium citrate solution, followed by heating to 35° C. 30 mL of a 3 mM aqueous sodium borohydride solution was added to the above solution, and with stirring, 300 mL of a 0.5 mM aqueous silver nitrate solution (Ag-1) was added thereto at a rate of 20 mL/min. This solution was stirred for 30 minutes, and then 500 mL of a 2.5 mM aqueous sodium citrate solution and 25 mL of a 5.0 mM aqueous ascorbic acid solution was added thereto. Further, with stirring, 300 mL of a 0.5 mM aqueous silver nitrate solution (Ag-2) was added thereto at a rate of 10 mL/min. After stirring for 30 minutes, 284 mL of a 0.35 M aqueous potassium hydroquinonesulfonate solution and 400 g of a 14%-by-mass aqueous gelatin solution were added to the reactor. Next, a white precipitate mixture liquid of silver nitrate, prepared by mixing 343 mL of a 0.305 M aqueous sodium sulfite solution and 343 mL of a 0.588 M aqueous silver nitrate solution, was added thereto. This solution was stirred for 300 minutes to obtain a tabular silver particle dispersion B1.

The characteristics of the metal particles in the obtained tabular silver particle dispersion B1 were evaluated according to the following methods. It was confirmed that hexagonal tabular particles of silver (hereinafter referred to as hexagonal tabular silver particles) having a mean circle-equivalent diameter of 105 nm were produced in the tabular silver particle dispersion B1.

—Evaluation of Metal Particles—

(Proportion of Tabular Particles, Mean Particle Diameter (Mean Circle-Equivalent Diameter), and Fluctuation Coefficient)

The shape uniformity of the tabular Ag particles was confirmed as follows. The observed SEM image was analyzed for the shape of 200 particles extracted arbitrarily thereon. Of those particles, hexagonal to circular tabular metal particles were referred to as A, and atypical particles such as tears-like ones or other polygonal particles less than hexagonal ones were referred to as B. The proportion (% by number) of the particles corresponding to A was calculated by performing image analysis. The obtained results are shown in Table 1 below.

Further, similarly, the particle diameter of each of those 100 particles corresponding to A was measured with a digital caliper, and a mean value thereof was referred to as a mean particle diameter (mean circle-equivalent diameter) of the tabular particles A. The obtained results are shown in Table 1 below.

The standard deviation of the particle diameter distribution was divided by the mean particle diameter (mean circle-equivalent diameter) to give the coefficient of variation (%) of the mean circle-equivalent diameter (particle size distribution) of the tabular particles A. The obtained results are shown in Table 1 below.

(Mean Particle Thickness)

The obtained tabular silver particle dispersion B1 was dropped onto a glass substrate and dried, and the thickness of one tabular metal particle corresponding to A was measured with an atomic force microscope (AFM) (Nanocute II, manufactured by Seiko Instruments, Inc.). The condition in measurement with AFM was as follows: an autodetection sensor, a DFM mode, a measurement range of 5 μm, a scanning speed of 180 seconds/1 frame, and a data score was 256×256. The mean value of the obtained data is referred to as a mean particle thickness of the tabular particles A. The obtained results are shown in Table 1 below.

In addition, from the mean particle diameter (mean circle-equivalent diameter) and the mean particle thickness of the obtained tabular metal particles corresponding to A, the aspect ratio of the tabular particles A was calculated by dividing the mean particle diameter (mean circle-equivalent diameter) by the mean particle thickness. The obtained results are shown in Table 1 below.

—Preparation of Metal Particles-Containing Layer—

500 mL of the tabular silver particle dispersion B1 was centrifuged in a centrifuge (H-200N, manufactured by Kokusan Co., Ltd., Amble Rotor BN) at 7,000 rpm for 30 minutes to precipitate the hexagonal tabular silver particles. After the centrifugation, 450 ml of the supernatant was removed and 200 mL of pure water was added to the residue so as to redisperse the precipitated hexagonal tabular silver particles, thereby preparing a tabular silver dispersion.

Further, the following compounds were added thereto to prepare a coating liquid 1.

Composition of Coating Liquid 1:
Tabular silver particle dispersion B1
  160 ml (2.8 g as silver)
Polyester resin binder: Plascoat Z-687 (manufactured by Goo Chemical Co., Ltd)
  100 g
Carbodiimide-based crosslinking agent: Carbodilite V-02-L2 (manufactured by Nisshinbo Holdings, Inc.)
  8.8 g
Surfactant A: Rapisol A-90 (manufactured by NOF Corp.)
  9.6 g
Surfactant B: Naroacty HN-100 (manufactured by Sanyo Chemical Industries, Ltd.) 12.0 g
Pure water 300 cc Using a wire coating bar No. 6 (manufactured by R.D.S. Webster N.Y.), the coating liquid 1 was coated onto a PET film (Cosmoshine A4300, manufactured by Toyobo Co., Ltd., thickness: 75 μm), and dried to obtain a film having the hexagonal tabular silver particles fixed on the surface thereof.

As in the above, an infrared ray shielding film of Comparative Example 1 was prepared.

(Coating Rate)

For the infrared ray shielding film obtained in Comparative Example 1, the coating rate of the metal particle-containing layer was measured by the following method.

The layer including tabular silver particles was coated and dried, and then the SEM image of the surface thereof was observed using an 54300 scanning electron microscope manufactured by Hitachi, Ltd. Then, the proportion of the perspective area of the tabular silver particles in the unit area was determined as a coating rate.

The obtained coating rates are described in Table 1 below.

(Thickness of Existence Region of Tabular Particles)

In the obtained infrared ray shielding film of Comparative Example 1, the thickness of the existing region of the tabular silver particles was measured according to the following method.

After the coated sample was buried in an epoxy resin, this was cut with a microtome to give an ultra-thin section, which was then subjected to SEM observation using S-5500 Model FE-SEM manufactured by Hitachi High-Technologies Corporation. As a result, the thickness of the metal particle-containing layer was 70 nm. Further, the hexagonal tabular silver particles were arranged substantially in parallel to the PET film on the upper part of the metal particle-containing layer. Although the mechanism of uneven distribution of the tabular metal particles on the surface is not sufficiently clarified, it is considered to be important that the metal particles must indispensably be floated in the liquid surface in coating and drying and that the surface tension balance that would vary in drying would have to be kept well.

(Characteristics of Metal Particle-Containing Layer)

For the obtained infrared ray shielding film of Comparative Example 1, the number of reflection peaks and the absorption peaks of the metal particle-containing layer were measured by the following method.

The reflection and absorption spectra of the infrared ray shielding film were measured every 5 nm using a U3500 spectrophotometer manufactured by Hitachi, Ltd., and when the average of the values at five points including the two points before and after the point was referred to as a value of the point, a case where the signal of the difference between the previous and latter points is changed from a positive one to a negative one was defined as a peak.

The number of the reflection peaks and the absorption peaks of the obtained metal particle-containing layer are described in Table 1 below.

Comparative Example 2

In the same manner as in Comparative Example 1, except that the addition amount of the 0.5 mM aqueous silver nitrate solution (Ag-1) was changed to 75 mL in Comparative Example 1, a tabular silver particle dispersion B2 was prepared, and in the same manner as in Comparative Example 1, except that the tabular silver particle dispersion B2 was used, a coating liquid 2 was prepared. In the same manner as in Comparative Example 1, except that the coating liquid 2 was used, an infrared ray shielding film of Comparative Example 2 having the configuration shown in Table 1 below was prepared.

Comparative Example 3

In the same manner as in Comparative Example 1, except that the addition amount of the 0.5 mM aqueous silver nitrate solution (Ag-1) was changed to 120 mL and an white precipitate mixture liquid of silver sulfite formed by mixing 343 mL of a 0.882 M aqueous sodium sulfite solution and 343 mL of a 0.588 M aqueous silver nitrate solution was added in Comparative Example 1, a coating liquid 3 was prepared. In the same manner as in Comparative Example 1, except that the coating liquid 3 was used, an infrared ray shielding film of Comparative Example 3 having the configuration shown in Table 1 below was prepared.

Example 1

In the same manner as in Comparative Example 1, except that the tabular silver particle dispersion B1 prepared in Comparative Example 1 and the tabular silver particle dispersion B2 prepared in Comparative Example 2 were mixed at a weight ratio of 1:1 to obtain a silver particle dispersion 4, a coating liquid 4 was prepared. In the same manner as in Comparative Example 1, except that the coating liquid 4 was used, an infrared ray shielding film of Example 1 having the configuration shown in Table 1 below was prepared.

Comparative Examples 4, 5, and 6 and Example 2

In the same manner as in Comparative Examples 1, 2, and 3 and Example 1, except that the amount of each of the tabular silver particle dispersions used for the preparation of the coating liquids 1 to 4 was changed to 240 mL (silver 4.2 g), and the addition amount of pure water was changed to 220 cc in Comparative Examples 1, 2, and 3 and Example 1, infrared ray shielding films of Comparative Examples 4, 5, and 6 and Example 2 having the configuration shown in Table 1 below was prepared.

Comparative Examples 7, 8, and 9, and Example 3

Using a wire coating bar No. 10 (manufactured by R.D.S. Webster N.Y.), an ITO hard coat coating liquid (EI-1 manufactured by Mitsubishi Materials Corporation) was coated onto a side surface different from the coated surface of the PET film tabular silver particle dispersion in Comparative Examples 4, 5, and 6, and Example 2 to give a layer thickness after drying became 1.5 μm to provide a metal oxide particle-containing layer, thereby preparing infrared ray shielding films of Comparative Examples 7, 8, and 9, and Example 3 shown in Table 1. Further, it could be found that the content of the ITO particles in the metal oxide particle-containing layer was 3.0 g/m².

—Measurement of Content of ITO Particles—

The content with respect to the total mass of the infrared ray shielding film of the ITO particles was calculated as follows. The ITO particles in a given area of the entire heat ray shielding infrared ray shielding film was eluted into methanol, the mass of the ITO particles was measured by X-ray fluorescence measurement, and the mass was divided by a predetermined area.

Example 4

—Preparation of Coating Liquid U1 for UV Absorbent Layer—

A coating liquid U1 for a UV absorbent layer, having the composition shown below, was prepared.

Composition of Coating Liquid U1 for UV Absorbent Layer:

UV absorbent: Tinuvin 326 (manufactured by Ciba Japan Ltd.) 10 parts by mass

Binder: 10%-by-mass polyvinyl alcohol solution 10 parts by mass

Water 30 parts by mass

These were mixed and controlled to have a volume average particle diameter of 0.6 μm, using a ball mill.

—Formation of UV Absorbent Layer—

The coating liquid U1 for a UV absorbent layer was coated onto the metal particle-containing layer of the infrared ray shielding film in Example 3, using a wire bar, in such a manner that the mean thickness after drying could be 0.5 μm. Subsequently, this was heated at 100° C. for 2 minutes, dried, and solidified to form a UV absorbent layer that serves also as an overcoat layer.

The laminate including metal oxide particle-containing layer/PET film/metal particle-containing layer that contains tabular particles/UV absorbent layer serving also as overcoat layer, as laminated in that order, was referred to as a heat ray shielding film.

—Formation of Adhesive Layer—

The surface of the obtained heat ray shielding film was washed, and an adhesive layer was laminate thereonto. As the adhesive layer (adhesive agent), PET-W manufactured by Sanritz Corporation was used. The release film was peeled from one side of PET-W, and the adhesive film was then laminated onto the UV absorbent layer surface of the heat ray shielding film. According to the above process, an infrared ray shielding film of Example 4, including metal oxide particle-containing layer/PET film/metal particle-containing layer that contains tabular particles/UV absorbent layer serving also as overcoat layer/adhesive layer, as laminated in that order, was prepared.

For the obtained infrared ray shielding film in Example 4, the thickness of the metal particle-containing layer and the existence region of the tabular particles were measured by the same method as in Example 1. As a result, the thickness of the metal particle-containing layer was 75 nm. Further, the tabular particles were arranged substantially in parallel to the interface of the UV absorbent layer serving as both a metal particle-containing layer and an overcoat layer.

[Evaluation]

—Evaluation of Optical Performance—

(Heat Ray Reflectance)

For the infrared ray shielding film of each of Examples and Comparative Examples, a mean reflectance value at 800 nm to 2000 nm, as measured using a U3500 spectrophotometer manufactured by Hitachi, Ltd., was referred to as a heat ray reflectance (%). The obtained results are shown in Table 1 below.

(Reflection Band Width with Reflectance of More than 20%)

For the infrared ray shielding film of each of Examples and Comparative Examples, a reflection band width having a reflectance of more than 20% was determined from the reflectance of each wavelength measured in a range from 800 nm to 2,000 nm, and the heat shieldability was evaluated. The reflectance was measured using a U3500 spectrophotometer manufactured by Hitachi, Ltd., and in the case where there is no light shielding film of the present invention, the reflectance band of 20% or more was determined. The width of the reflection band was preferably large.

<Evaluation Criteria>

A: The reflectance band of 20% or more was 900 nm or more.

B: The reflectance band of 20% or more was from 600 nm to less than 900 nm.

C: The reflectance band of 20% or more was from 400 nm to less than 600 nm.

D: The reflectance band of 20% or more was less than 400 nm.

The evaluation results are shown in Table 1.

(Heat Ray Absorption Rate)

Moreover, the heat ray absorption rate of the infrared ray shielding film of each of Examples and Comparative Examples was determined by the following method. That is, a mean transmittance value in the region of 800 nm to 2000 nm, as measured using a U3500 spectrophotometer manufactured by Hitachi, Ltd., was referred to as a heat ray transmittance (%). A value obtained by subtracting the value of the heat ray reflectance and the heat ray transmittance from 100% was referred to as a heat ray absorption rate (%). The obtained results are shown in Table 1 below.

TABLE 1

| | Metal particle-containing layer Constitution of metal particle-containing layer | | | | | | |
|---|---|---|---|---|---|---|---|
| | Proportion (% by number) of tabular particles A in all metal particles | Mean circle-equivalent diameter (nm) of tabular particles A | Fluctuation coefficient (%) of mean circle-equivalent diameter of tabular particles A | Mean particle thickness (nm) of mean particles A | Mean aspect ratio | Coating rate (%) | Thickness (nm) of existence region of tabular particles |
| Comparative Example 1 | 85 | 105 | 32 | 10.5 | 10.0 | 30 | 40 |
| Comparative Example 2 | 88 | 250 | 35 | 10.8 | 23.1 | 30 | 40 |
| Comparative Example 3 | 90 | 186 | 47 | 10.8 | 17.2 | 30 | 40 |
| Example 1 | 86.5 | 178 | — | 10.7 | 16.6 | 30 | 40 |
| Comparative Example 4 | 86 | 105 | 32 | 10.5 | 10.0 | 45 | 40 |
| Comparative Example 5 | 86 | 250 | 35 | 10.8 | 23.1 | 45 | 40 |
| Comparative Example 6 | 86 | 186 | 47 | 10.8 | 17.2 | 45 | 40 |
| Example 2 | 86.5 | 178 | — | 10.7 | 16.6 | 45 | 40 |
| Comparative Example 7 | 86 | 105 | 32 | 10.5 | 10.0 | 45 | 40 |
| Comparative Example 8 | 86 | 250 | 35 | 10.8 | 23.1 | 45 | 40 |
| Comparative Example 9 | 86 | 186 | 47 | 10.8 | 17.2 | 45 | 40 |
| Example 3 | 86.5 | 178 | — | 10.7 | 16.6 | 45 | 40 |
| Example 4 | 86.5 | 178 | — | 10.7 | 16.6 | 45 | 45 |

| | Metal particle-containing layer Characteristics of metal particle-containing layer | | Metal oxide particle-containing layer | Evaluation of heat ray shielding material | | |
|---|---|---|---|---|---|---|
| | Number of reflection peaks | Number of absorption peaks | ITO coating amount (g/m²) | Heat ray reflectance (%) | Refraction band width of more than 20% | Heat ray absorption rate (%) |
| Comparative Example 1 | 1 | 1 | 0 | 13 | D | — |
| Comparative Example 2 | 1 | 1 | 0 | 19 | C | — |
| Comparative Example 3 | 1 | 1 | 0 | 20 | C | — |
| Example 1 | 2 | 2 | 0 | 22 | B | — |
| Comparative Example 4 | 1 | 1 | 0 | 16 | D | — |
| Comparative Example 5 | 1 | 1 | 0 | 29 | B | — |
| Comparative Example 6 | 1 | 1 | 0 | 31 | B | — |
| Example 2 | 2 | 2 | 0 | 33 | A | — |
| Comparative Example 7 | 1 | 1 | 3 | 16 | — | 70 |
| Comparative Example 8 | 1 | 1 | 3 | 29 | — | 54 |

TABLE 1-continued

| Comparative Example 9 | 1 | 1 | 3 | 31 | — | 55 |
|---|---|---|---|---|---|---|
| Example 3 | 2 | 2 | 3 | 33 | — | 50 |
| Example 4 | 2 | 2 | 3 | 33 | — | 50 |

As seen from Table 1, as in the present invention, it could be found that the infrared ray shielding film of each Example, having metal particles having two reflection peaks (also having two absorption peaks) in an infrared region (800 nm to 2000 nm) in one layer exhibits good heat ray reflection characteristics and has a wide 20% reflection band width, as compared with the infrared ray shielding film of each Comparative Examples including a metal particle-containing layer having a single reflection (absorption) peak.

Furthermore, in the case of using metal oxide ITO absorbing heat rays in combination therewith, the heat ray absorption amount can be reduced, and thus, the risks such as heat cracks are reduced, as seen from comparison between Comparative Example 9 and Example 3, or the like.

Also, for the infrared ray shielding film of Example 4, all the characteristics were investigated as in Example 3, and the same tendency as in Example 3 was shown.

In addition, the infrared ray shielding films of Comparative Examples 5 and 6 were deteriorated in both of the heat ray reflectance and the 20% ultra-reflection band, as compared with the sample of Example 2 with the same silver coating amount.

The RMS granularities of Comparative Examples 1, 2, 3, 4, 5, 6, 7, 8, and 9 were more than 25%.

—Particle Tilt Angle—

The infrared ray shielding film of each of Examples was buried in an epoxy resin and then cut with a razor in the state of being frozen with liquid nitrogen to prepare a vertical cross-sectional sample of the infrared ray shielding film. The vertical cross-sectional sample was observed with a scanning electron microscope (SEM), and 100 tabular metal particles were analyzed in view of the tilt angle thereof to the horizontal plane of the substrate (corresponding to ±θ in FIG. 5B), and calculated as a mean value thereof. As a result, the infrared ray shielding film of each of Examples was in the tilt angle range of from ±5° to ±15°.

Figure 3:
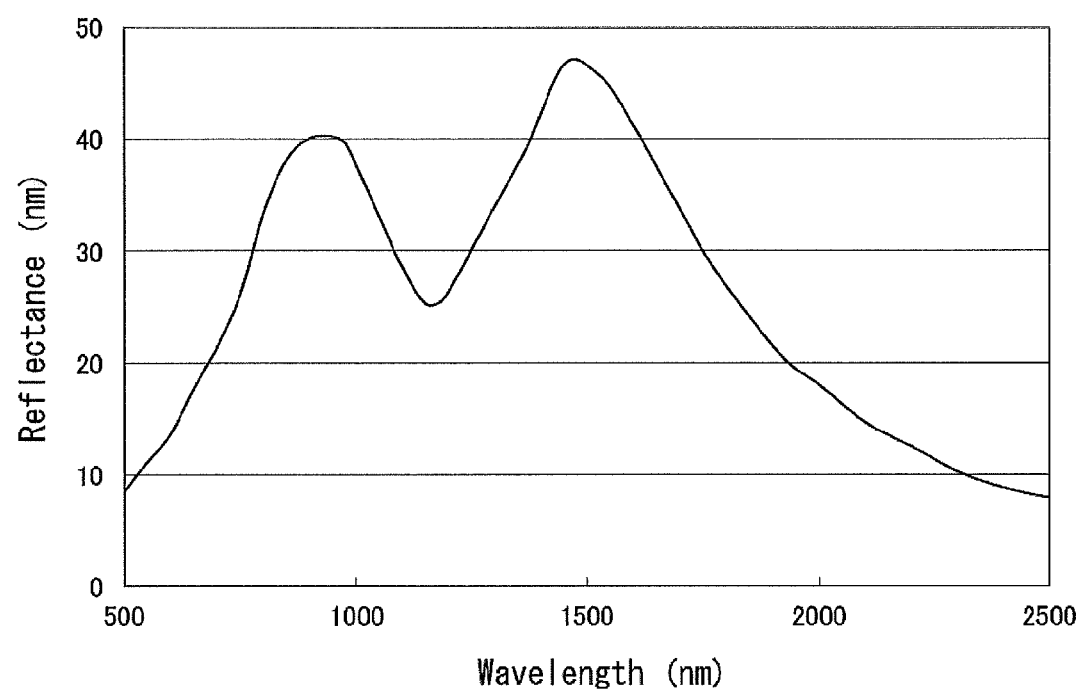
FIG. 3 is a reflection spectrum of the infrared ray shielding film of Example 2.

Furthermore, in the spectra used for counting the number of reflection peaks and the number of absorption peaks of the metal particle-containing layer of the infrared ray shielding film of each of Examples and Comparative Examples, as a representative example, the reflection spectrum of the metal particle-containing layer of the infrared ray shielding film of Example 2 is shown in FIG. 3. From FIG. 3, it can be found that the metal particle-containing layer of the infrared ray shielding film of Example 2 has two reflection peaks.

Preparation Example 1

(Preparation of Tabular Silver Particle Dispersion) B11
—Synthesis of Tabular Silver Particles (Preparation of Tabular Silver Particle Dispersion A11)—
——Synthesis Step for Tabular Core Particles——

2.5 mL of a 0.5 g/L aqueous polystyrenesulfonic acid solution was added to 50 mL of a 2.5 mM aqueous sodium citrate solution, followed by heating to 35° C. 3 mL of a 10 mM aqueous sodium borohydride solution was added to the above solution, and with stirring, 50 mL of a 0.5 mM aqueous silver nitrate solution was added thereto at a rate of 20 mL/min. The solution was stirred for 30 minutes to prepare a seed solution.

——First Growth Step for Tabular Particles——

Next, 2 mL of a 10 mM aqueous ascorbic acid solution was added to 250 mL of the seed solution, followed by heating to 35° C. With stirring, 79.6 mL of a 0.5 mM aqueous silver nitrate solution was added thereto at a rate of 10 mL/min.

——Second Growth Step for Tabular Particles——

Furthermore, the solution was stirred for 30 minutes, 71.1 mL of a 0.35 M aqueous potassium hydroquinonesulfonate solution was added to the reactor, and 200 g of a 7%-by-mass aqueous gelatin solution was added thereto. A white precipitate mixture liquid of silver sulfite, formed by mixing 107 mL of a 0.26 M aqueous sodium sulfite solution and 107 mL of a 0.47 M aqueous silver nitrate solution, was added thereto. Until the silver was sufficiently reduced, stirring was continued and 72 mL of a 0.17 M aqueous NaOH solution was added thereto to obtain a tabular silver particle dispersion A11.

It was found that in the obtained tabular silver particle dispersion A11, hexagonal silver tabular particles (hereinafter referred to as hexagonal Ag tabular particles) having a mean circle-equivalent diameter of 130 nm were produced. Further, the thickness of the hexagonal tabular particles were measured with an atomic force microscope (Nanocute II, manufactured by Seiko Instruments Inc.), and it was found that tabular particles having a mean thickness of 10 nm and an aspect ratio of 13 were produced. The results are shown in Table 2 below.

—Preparation of Tabular Silver Particle Dispersion B11—

0.5 mL of 1 N NaOH was added to 60 mL of the tabular silver particle dispersion A11, 90 mL of ion exchange water was added thereto, and the mixture was centrifuged in a centrifuge (H-200N manufactured by Kokusan, Amble Rotor BN) to precipitate the hexagonal tabular Ag particles. After the centrifugation, the supernatant was removed, 10 mL of water was added thereto, and the precipitated, hexagonal tabular Ag particles were redispersed with a homogenizer SX-10 (manufactured by Mitsui Electric Co., Ltd.) at 13000 rpm for 20 minutes to obtain a tabular silver particle dispersion B11 of Preparation Example 1.

<<Evaluation of Metal Particles>>

Next, for the obtained metal particles, all the characteristics were evaluated as follows. The results are shown in Table 2 below.

—Proportion of Tabular Particles, Mean Particle Diameter (Mean Circle-Equivalent Diameter), and Fluctuation Coefficient—

The shape uniformity of the tabular Ag particles was confirmed as follows. The observed SEM image was analyzed for the shape of 200 tabular particles extracted arbitrarily from the SEM image for observation of the tabular silver particle dispersion B11. Of those particles, the image analysis was performed, in which hexagonal to circular tabular metal particles were referred to as A, and atypical particles such as tears-like ones or other polygonal tabular particles less than hexagonal ones were referred to as B. Thus, the proportion (% by number) of the particles corresponding to A was determined.

Furthermore, the particle diameter of 200 tabular particles arbitrarily extracted from the SEM image was measured with a digital caliper, and a mean value thereof was referred to as a mean particle diameter (mean circle-equivalent diameter), and the standard deviation of the particle diameter distribution was divided by the mean particle diameter (mean circle-equivalent diameter) to determine a coefficient of variation (%) of the particle size distribution.

—Mean Particle Thickness—

The obtained tabular silver particle dispersion B11 was dropped onto a glass substrate and dried, and the thickness of one tabular metal particle corresponding to A was measured using an atomic force microscope (AFM) (Nanocute II, manufactured by Seiko Instruments, Inc.). Further, the condition in measurement with AFM was as follows: an autodetection sensor, a DFM mode, a measurement range of 5 μm, a scanning speed of 180 seconds/1 frame, and a data score of 256×256. The mean value of the obtained data is referred to as a mean particle thickness of the tabular particles.

—Aspect Ratio—

From the mean particle diameter (mean circle-equivalent diameter) and the mean particle thickness of the obtained tabular metal particles corresponding to A, a mean particle diameter (mean circle-equivalent diameter) of the tabular metal particles corresponding to A was divided by the mean particle thickness to calculate an aspect ratio of the tabular metal particles corresponding to A.

—Transmission Spectrum of Planar Silver Dispersion—

The transmission spectrum of the obtained tabular silver dispersion was measured using a UV-Visible-Near IR spectrophotometer (V-670, manufactured by JASCO Corporation) after the dilution, and the peak wavelength was determined.

Preparation Example 2

(Preparation of Tabular Silver Particle Dispersion B12)

In the same manner as for the tabular silver particle dispersion B11, except that the redispersion was not performed at 13000 rpm for 20 minutes using a homogenizer SX-10, but instead redispersion was performed at 13000 rpm for 10 minutes using a homogenizer SX-10, a tabular silver particle dispersion B12 was prepared.

Preparation Example 3

(Preparation of Tabular Silver Particle Dispersion B13)

In the same manner as for the tabular silver particle dispersion B11, except that redispersion was not performed at 13000 rpm for 20 minutes using a homogenizer SX-10, but instead redispersion was performed at 13000 rpm for 5 minutes using a homogenizer SX-10, a tabular silver particle dispersion B13 was prepared.

Preparation Example 4

(Preparation of Tabular Silver Particle Dispersion B14)

In the same manner as for the tabular silver particle dispersion B11, except that redispersion was not performed at 13000 rpm for 20 minutes using a homogenizer SX-10, but instead redispersion was performed by stirring for 10 minutes with the hands, a tabular silver particle dispersion B14 was prepared.

Preparation Example 5

(Preparation of Tabular Silver Particle Dispersion B15)

—Preparation of Tabular Silver Particle Dispersion A12—

First, in the first growth step for the tabular particles, in the same manner as for the tabular silver particle dispersion A11 in Preparation Example 1, except that 250 mL of the seed solution was not added, but instead 50 mL of the seed solution and 200 mL of ion exchange water were added, a tabular silver particle dispersion A12 was prepared.

—Preparation of Tabular Silver Particle Dispersion B15—

Next, in the same manner as for the tabular silver particle dispersion B11, except that instead of the tabular silver particle dispersion A11, the tabular silver particle dispersion A12 as prepared above was used, a tabular silver particle dispersion B15 was prepared.

Preparation Example 6

(Preparation of Tabular Silver Particle Dispersion B16)

In the same manner as for the tabular silver particle dispersion B12, except that instead of the tabular silver particle dispersion A11, the tabular silver particle dispersion A12 was used, a tabular silver particle dispersion B16 was prepared.

Preparation Example 7

(Preparation of Tabular Silver Particle Dispersion B17)

In the same manner as for the tabular silver particle dispersion B13, except that instead of the tabular silver particle dispersion A11, the tabular silver particle dispersion A12 was used, a tabular silver particle dispersion B17 was prepared.

Preparation Example 8

(Preparation of Tabular Silver Particle Dispersion B18)

In the same manner as for the tabular silver particle dispersion B14, except that instead of the tabular silver particle dispersion A11, the tabular silver particle dispersion A12 was used, a tabular silver particle dispersion B18 was prepared.

Preparation Example 9

(Preparation of Tabular Silver Particle Dispersion B19)

—Preparation of Tabular Silver Particle Dispersion A13—

First, in the second growth step for the tabular particles, in the same manner as for the tabular silver particle dispersion A11 in Preparation Example 1, except that 107 mL of a 0.25 M aqueous sodium sulfite solution was not added, but instead 107 mL of a 0.4 M aqueous sodium sulfite solution was added, a tabular silver particle dispersion A13 was prepared.

—Preparation of Tabular Silver Particle Dispersion B19—

Next, in the same manner as for the tabular silver particle dispersion B11, except that instead of the tabular silver particle dispersion A11, the tabular silver particle dispersion A13 as described above was used, a tabular silver particle dispersion B19 was prepared.

Preparation Example 10

(Preparation of Tabular Silver Particle Dispersion B20)
—Preparation of Tabular Silver Particle Dispersion A14—

First, in the second growth step for the tabular particles, in the same manner as for the tabular silver particle dispersion A11 in Preparation Example 1, except that 107 mL of a 0.25 M aqueous sodium sulfite solution was not added, but instead 107 mL of a 0.3 M aqueous sodium sulfite solution was added, a tabular silver particle dispersion A14 was prepared.

—Preparation of Tabular Silver Particle Dispersion B20—

Next, in the same manner as for the tabular silver particle dispersion B11, except that instead of the tabular silver particle dispersion A11, the tabular silver particle dispersion A4 as described above was used, a tabular silver particle dispersion B20 was prepared.

In the same manner as for the evaluation of the tabular silver particle dispersion B11 in Preparation Example 1, the tabular silver particle dispersions B12 to B20 prepared in Preparation Examples 2 to 10 were evaluated.

The evaluation results of the tabular silver particle dispersions B11 to B20 prepared in Preparation Examples 1 to 10 are shown in Table 2 below.

TABLE 2

| | Tabular silver particle dispersion used | Dispersion method | Shape of hexagonal to circular tabular particles | Proportion (% by number) of hexagonal to circular tabular particles in all metal particles |
|---|---|---|---|---|
| Tabular silver particles dispersion B11 | Tabular silver particles dispersion A11 | Homogenizer 20 minutes | Hexagonal | 93 |
| Tabular silver particles dispersion B12 | Tabular silver particles dispersion A11 | Homogenizer 10 minutes | Hexagonal | 93 |
| Tabular silver particles dispersion B13 | Tabular silver particles dispersion A11 | Homogenizer 5 minutes | Hexagonal | 93 |
| Tabular silver particles dispersion B14 | Tabular silver particles dispersion A11 | Hand stirred 10 minutes | Hexagonal | 93 |
| Tabular silver particles dispersion B15 | Tabular silver particles dispersion A12 | Homogenizer 20 minutes | Hexagonal | 92 |
| Tabular silver particles dispersion B16 | Tabular silver particles dispersion A12 | Homogenizer 10 minutes | Hexagonal | 92 |
| Tabular silver particles dispersion B17 | Tabular silver particles dispersion A12 | Homogenizer 5 minutes | Hexagonal | 92 |
| Tabular silver particles dispersion B18 | Tabular silver particles dispersion A12 | Hand stirred 10 minutes | Hexagonal | 92 |
| Tabular silver particles dispersion B19 | Tabular silver particles dispersion A13 | Homogenizer 20 minutes | Hexagonal | 85 |
| Tabular silver particles dispersion B20 | Tabular silver particles dispersion A14 | Homogenizer 20 minutes | Hexagonal | 89 |

| | Characteristics of hexagonal to circular tabular particles | | | | Peak wavelength (nm) of transmission spectrum of metal particle dispersion |
|---|---|---|---|---|---|
| | Mean particle diameter | Fluctuation coefficient (%) of particle size distribution | Mean particle thickness (nm) | Aspect ratio | |
| Tabular silver particles dispersion B11 | 130 | 12 | 10 | 13 | 1010 |
| Tabular silver particles dispersion B12 | 130 | 12 | 10 | 13 | 1010 |
| Tabular silver particles dispersion B13 | 130 | 12 | 10 | 13 | 1010 |
| Tabular silver particles dispersion B14 | 130 | 12 | 10 | 13 | 1010 |
| Tabular silver particles dispersion B15 | 300 | 11 | 11 | 27 | 1600 |
| Tabular silver particles dispersion B16 | 300 | 11 | 11 | 27 | 1600 |
| Tabular silver particles dispersion B17 | 300 | 11 | 11 | 27 | 1600 |
| Tabular silver particles dispersion B18 | 300 | 11 | 11 | 27 | 1600 |
| Tabular silver particles dispersion B19 | 160 | 24 | 8 | 20 | 1350 |
| Tabular silver particles dispersion B20 | 140 | 14 | 10 | 14 | 1120 |

Example 11

—Preparation of Coating Liquid 11—

The coating liquid 11 having the composition shown below was prepared.

Composition of Coating Liquid 11:
Polyester latex aqueous dispersion: Finetex ES-650, (manufactured by DIC Corp., solid content concentration: 30% by mass) 28.2 parts by mass
Surfactant A: Rapisol A-90 (manufactured by NOF Corp., solid content: 1% by mass) 12.5 parts by mass
Surfactant B: Aronakuti CL-95 (manufactured by Sanyo Chemical Industries, Ltd., solid content: 1% by mass) 15.5 parts by mass
Tabular silver particle dispersion B1
50 parts by mass
Tabular silver particle dispersion B5
150 parts by mass
Water 800 parts by mass —Formation of Metal Particle-Containing Layer—

Figure 4:
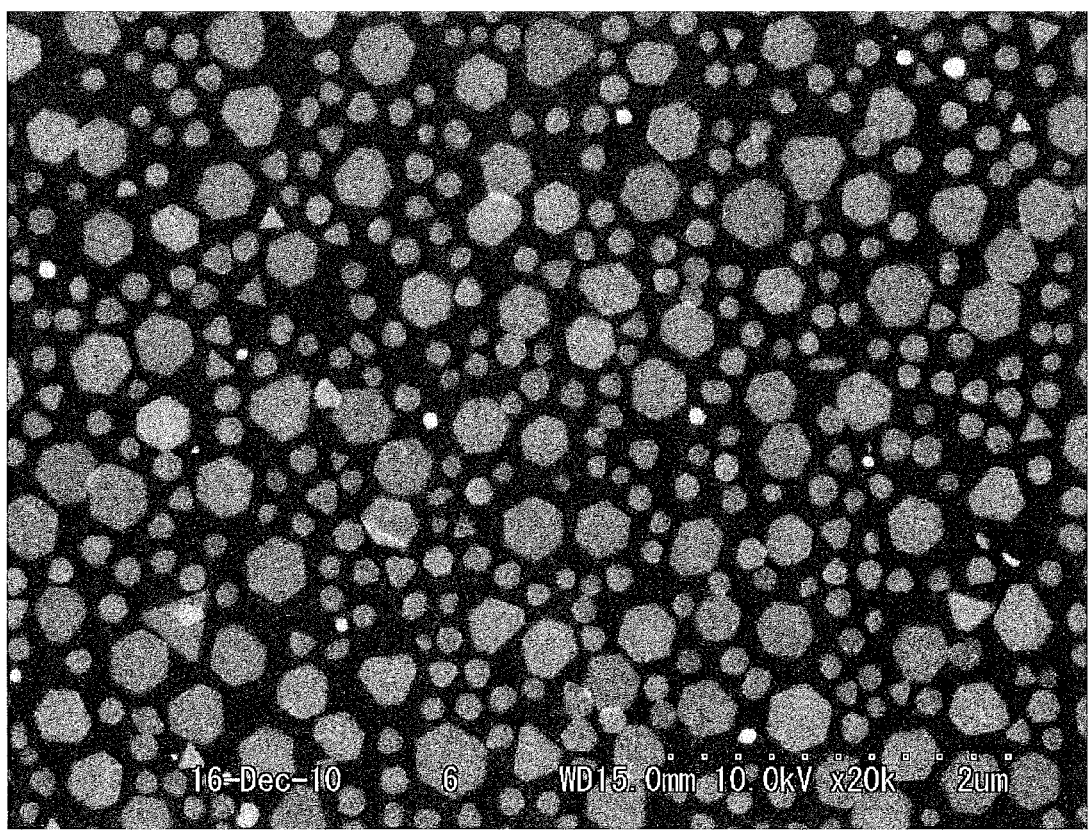
FIG. 4 is an SEM image of the heat ray shielding material of Example 11.
Figure 5:
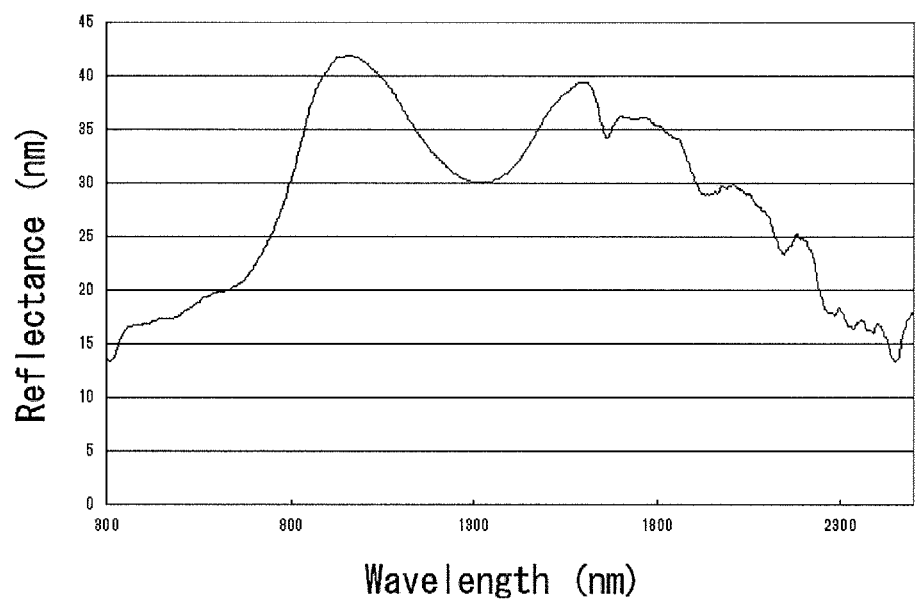
FIG. 5 is a reflection spectrum of the heat ray shielding material of Example 11.

Using a wire coating bar, the coating liquid 11 was coated onto a surface of a PET film (Cosmoshine A4300, manufactured by Toyobo Co., Ltd., thickness: 75 μm) to give a mean thickness after drying of 0.08 μm (80 nm). Thereafter, the product was heated at 150° C. for 10 minutes, dried, and solidified to form a metal particle-containing layer, thereby obtaining the heat ray shielding material of Example 11. The SEM image of the heat ray shielding material of Example 11 is shown in FIG. 4, and also, the reflection spectrum of the heat ray shielding material of Example 11 is shown in FIG. 5.

<<Evaluation of Heat Ray Shielding Material>>

Next, all the characteristics of the obtained heat ray shielding material of Example 11 were measured as follows. The results are shown in Table 3 below.

—Particle Tilt Angle—

The heat ray shielding material was buried in an epoxy resin and then cut with a razor in the state of being frozen with liquid nitrogen to prepare a vertical cross-sectional sample of the heat ray shielding material. The vertical cross-sectional sample was observed with a scanning electron microscope (SEM), and 100 tabular metal particles in the view field were analyzed in view of the tilt angle thereof to the horizontal plane of the substrate (corresponding to ±θ in FIG. 2A), and calculated as a mean value thereof.

<Evaluation Criteria>
B: The tilt was ±30° or less.
D: The tilt was more than ±30°.

—RMS Granularity of Tabular Metal Particles—

Figure 6A:
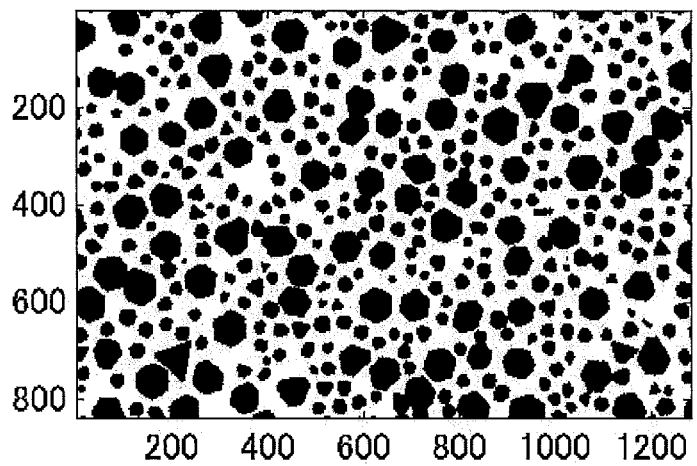
FIG. 6A is an image before the RMS patching treatment of the heat ray shielding material of Example 11.
Figure 6B:
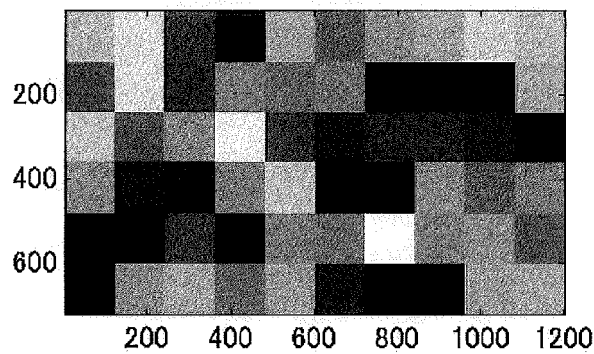
FIG. 6B is an image after the RMS patching treatment of the heat ray shielding material of Example 11.
Figure 6C:
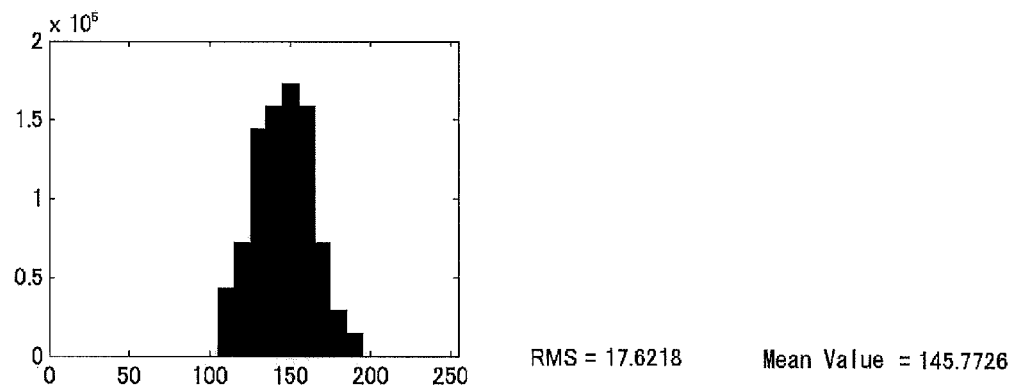
FIG. 6C is a histogram calculated from the image after the RMS patching treatment of the heat ray shielding material of Example 11.

For the prepared heat ray shielding material of Example 11, the surface of the heat ray shielding material was observed by a scanning electron microscope (SEM), the obtained SEM image was binarized, and the tabular metal particles and the substrate were separated. The results are shown in FIG. 6A as an image before the RMS patching treatment. Further, by sorting by a 0.6-μm square mesh shape, an image formed by obtaining an average of the concentrations in the mesh was prepared, which is shown in FIG. 6B as an image after the RMS patching treatment. A value as an average of the concentrations in the mesh from FIG. 6B was determined and a histogram shown in FIG. 6C was prepared. The coefficient of variation of the concentration which was obtained as an average, as calculated from the histogram shown in FIG. 6C, was referred to as the RMS granularity of the tabular metal particles of the heat ray shielding material of Example 11.

In addition, for the other heat ray shielding materials of each of Examples and Comparative Examples, the RMS granularity was determined in the same manner as in Example 11.

—Circle-Equivalent Diameter of Tabular Metal Particles, and Fluctuation Coefficient of Circle-Equivalent Diameter of Tabular Metal Particles—

Furthermore, the particle diameter of 200 particles arbitrarily extracted from the SEM image of the same heat ray shielding material as when determining the RMS granularity of the tabular metal particles was measured with a digital caliper, and a mean value thereof was referred to as a mean particle diameter (mean circle-equivalent diameter).

The standard deviation of the particle diameter distribution was divided by the mean particle diameter (mean circle-equivalent diameter) to determine a coefficient of variation (%) of the circle-equivalent diameter of the tabular metal particles.

—Proportions of Hexagonal to Circular, Tabular Metal Particles—

The shape uniformity of the tabular Ag particles was confirmed as follows. The observed SEM image was analyzed for the shape of 200 tabular particles extracted arbitrarily from the SEM image of the same heat ray shielding material when determining the RMS granularity of the tabular metal particles. Of those particles, hexagonal to circular tabular metal particles were referred to as A, and atypical particles such as tears-like ones or other polygonal tabular particles less than hexagonal ones were referred to as B. The proportion (% by number) of the particles corresponding to A in the heat ray shielding material was calculated by performing image analysis.

—Aspect Ratio of Tabular Metal Particles—

The thickness of 100 tabular metal particles from the SEM image of the same heat ray shielding material as when determining particle tilt angle of the tabular metal particles was measured with a digital caliper, and a mean value thereof was referred to as a mean thickness.

From the mean particle diameter (mean circle-equivalent diameter) and the mean particle thickness of the obtained tabular metal particles, a mean particle diameter (mean circle-equivalent diameter) of the tabular metal particles was divided by the mean particle thickness to calculate an aspect ratio of the tabular metal particles in the heat ray shielding material.

—Visible Light Transmittance—

For the prepared heat ray shielding material, a value obtained by correcting the transmittance at each of the wavelengths measured at 380 nm to 780 nm with the spectral sensitivity at each of the wavelengths measured was referred to as a visible light transmittance.

—Evaluation of Heat Shieldability—

(Mean Reflectance)

For the prepared heat ray shielding material, a mean value of the reflectances was determined from the reflectance at each of the wavelengths measured at 800 nm to 2,500 nm, and the heat shieldability was evaluated. A higher mean reflectance is more preferred.

<Evaluation Criteria>
A: The reflectance is 20% or more.
B: The reflectance is from 17% to less than 20%.
C: The reflectance is from 13% to 17%.
D: The reflectance is less than 13%.

(Reflection Band Width with Reflectance of 25% or More)

For each of the prepared heat ray shielding materials, a reflection band width having a reflectance of more than 25% was determined from the reflectance of each of the wavelengths measured at 800 nm to 2,500 nm, thereby evaluating the heat shieldability. A larger width of the reflection band was more preferable.

<Evaluation Criteria>

A: The reflectance band of more than 25% was 1200 nm or more.

B: The reflectance band of more than 25% was from 1000 nm to less than 1200 nm.

C: The reflectance band of more than 25% was from 800 nm to less than 1000 nm.

D: The reflectance band of more than 25% was less than 800 nm.

Example 12

In the same manner as in Example 11, except that the tabular silver particle dispersion B11 was replaced with the tabular silver particle dispersion B12 and the tabular silver particle dispersion B15 was replaced with the tabular silver particle dispersion B16 in Example 11, a heat ray shielding material of Example 12 was prepared.

Example 13

In the same manner as in Example 11, except that the tabular silver particle dispersion B11 was replaced with the tabular silver particle dispersion B13 and the tabular silver particle dispersion B15 was replaced with the tabular silver particle dispersion B17 in Example 11, a heat ray shielding material of Example 13 was prepared.

Example 14

In the same manner as in Example 11 except that the tabular silver particle dispersion B11 was replaced with the tabular silver particle dispersion B19 and the tabular silver particle dispersion B15 was replaced with the tabular silver particle dispersion B19 in Example 11, a heat ray shielding material of Example 14 was prepared.

Example 15

In the same manner as in Example 11, except that the tabular silver particle dispersion B11 was replaced with the tabular silver particle dispersion B20 and the tabular silver particle dispersion B15 was replaced with the tabular silver particle dispersion B20 in Example 11, a heat ray shielding material of Example 15 was prepared.

Comparative Example 11

In the same manner as in Example 11, except that the tabular silver particle dispersion B11 was replaced with the tabular silver particle dispersion B14 and the tabular silver particle dispersion B15 was replaced with the tabular silver particle dispersion B18 in Example 11, a heat ray shielding material of Comparative Example 11 was prepared.

Comparative Example 12

In the same manner as in Comparative Example 11, except that the tabular silver particle dispersion B18 was replaced with the tabular silver particle dispersion B14 in Comparative Example 11, a heat ray shielding material of Comparative Example 12 was prepared.

Comparative Example 13

In the same manner as in Comparative Example 12, except that the tabular silver particle dispersion B14 was replaced with the tabular silver particle dispersion Eli in Comparative Example 12, a heat ray shielding material of Comparative Example 13 was prepared.

For the heat ray shielding materials of Examples 12 to 15, and Comparative Examples 11 to 13, all the characteristics were evaluated in the same manner as in Example 11. The obtained results are shown in Table 3 below.

TABLE 3

| | Configuration of heat ray shielding material | | | | |
|---|---|---|---|---|---|
| | Tabular metal particle dispersion used | Particle tilt angle (plane orientation property) | RMS granularity | Fluctuation coefficient of circle-equivalent diameter | Mean circle-equivalent diameter (nm) of tabular metal particles |
| Example 11 | Silver tabular dispersion B11, B15 | B | 18 | 48% | 258 |
| Example 12 | Silver tabular dispersion B12, B16 | B | 23 | 51% | 258 |
| Example 13 | Silver tabular dispersion B13, B17 | B | 26 | 49% | 258 |
| Example 14 | Silver tabular dispersion B19 | B | 24 | 23% | 160 |
| Example 15 | Silver tabular dispersion B20 | B | 21 | 14% | 140 |
| Comparative Example 11 | Silver tabular dispersion B14, B18 | B | 35 | 50% | 258 |
| Comparative Example 12 | Silver tabular dispersion B14 | B | 33 | 12% | 130 |
| Comparative Example 13 | Silver tabular dispersion B11 | B | 19 | 10% | 130 |

TABLE 3-continued

| | Configuration of heat ray shielding material | | Evaluation of heat ray shielding material | | |
|---|---|---|---|---|---|
| | Proportion (% by number) of hexagonal to circular tabular particles in all the metal particles | Aspect ratio of tabular metal particles | Visible light transmittance | Shielding performance | |
| | | | | Mean solar reflectance | 25% reflection band width |
| Example 11 | 92 | 23.5 | 71% | A | A |
| Example 12 | 92 | 23.5 | 69% | B | A |
| Example 13 | 92 | 23.5 | 68% | B | A |
| Example 14 | 85 | 20 | 70% | B | B |
| Example 15 | 89 | 14 | 70% | B | C |
| Comparative Example 11 | 92 | 23.5 | 65% | D | C |
| Comparative Example 12 | 93 | 13 | 64% | D | D |
| Comparative Example 13 | 93 | 13 | 72% | C | D |

From the results of Table 3 above, it could be found that the heat ray shielding material of the present invention has good evaluation results for visible light transmittance and heat shieldability (mean solar reflectance). Further, it could also be found that the 25% reflection band width is wide.

It could be found that in the heat ray shielding material of Comparative Example 11, the RMS granularity of the tabular metal particles of the metal particle-containing layer does not satisfy the range of the present invention, and the heat shieldability is poor.

It could be found in the heat ray shielding material of Comparative Example 12, that the RMS granularity of the tabular metal particles and the coefficient of variation of the circle-equivalent diameter of the metal particle-containing layer do not satisfy the range of the present invention and the heat shieldability is poor.

It was found that in the heat ray shielding material of Comparative Example 13, the coefficient of variation of the circle-equivalent diameter of the tabular metal particles of the metal particle-containing layer does not satisfy the range of the present invention, the wavelength width capable of 25% or more solar reflection is small, and the shielding performance is poor.

In addition, it was confirmed that in Examples 13 and 34 of JP-A-2011-118347, the RMS granularity is higher than the range of the present invention.

INDUSTRIAL APPLICABILITY

The infrared ray shielding film of the present invention has a high heat ray reflectance and excellent heat shieldability, and is therefore suitably usable as one of various members requiring prevention of transmission of heat rays as, for example, a film or laminate structure for transportation means such as vehicles and buses, or a film or laminate structure for building materials.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/057126, filed Mar. 14, 2013; Japanese Application No. 2012-060998, filed Mar. 16, 2012; and Japanese Application No. 2012-078047, filed Mar. 29, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

REFERENCE SIGNS LIST

1 POLYMER FILM THAT IS A SUBSTRATE
2 METAL PARTICLE-CONTAINING LAYER
3 TABULAR METAL PARTICLES
D DIAMETER
L THICKNESS
F ($\lambda$) THICKNESS OF EXISTENCE REGION OF PARTICLES

What is claimed is:

1. An infrared ray shielding film having one or more metal particle-containing layers that contain at least one kind of metal particle, wherein: hexagonal and/or circular tabular metal particles are contained in 60% by number or more relative to a total number of the metal particles contained in the one or more metal particle-containing layers, and at least one of the one or more metal particle-containing layers has at least two absorption peaks or at least two reflection peaks in a region of 800 nm to 2000 nm, and further has a thickness of from 10 nm to 80 nm, wherein said thickness and a thickness of the hexagonal and/or circular tabular metal particles satisfy relationship $2a \leq d \leq 8a$, wherein a is the thickness of the hexagonal and/or circular tabular metal particles, and d is the thickness of the at least one of the one or more metal particle-containing layers, and
wherein the RMS granularity of the tabular metal particles is 25 or less.

2. The infrared ray shielding film according to claim 1, wherein the at least one of the one or more metal particle-containing layers has at least two transmission peaks in a region of 800 nm to 2000 nm.

3. The infrared ray shielding film according to claim 1, wherein the at least one of the one or more metal particle-containing layers, which has at least two absorption peaks or at least two reflection peaks in a region of 800 nm to 2000 nm, includes at least two kinds of hexagonal and/or circular tabular metal particles having a coefficient of variation of circle-equivalent mean diameters of 35% or less.

4. The infrared ray shielding film according to claim 1, wherein a mean value of angles formed between at least one interface of the one or more metal particle-containing layers and a main plane of the hexagonal and/or circular tabular metal particles is 30° or less.

5. The infrared ray shielding film according to claim 1, wherein a main plane of the tabular metal particles is plane-oriented in a range of from 0° to ±30° on average relative to one surface of the one or more metal particle-containing layers, a coefficient of variation of a circle-equivalent diameter of the tabular metal particles is 13% or more, and an RMS granularity of the tabular metal particles is 30 or less.

6. The infrared ray shielding film according to claim 5, wherein the RMS granularity of the tabular metal particles is 20 or less.

7. The infrared ray shielding film according to claim 1, wherein a coefficient of variation of a circle-equivalent diameter of the tabular metal particles is 20% or more.

8. The infrared ray shielding film according to claim 1, wherein a mean particle diameter of the tabular metal particles is from 70 nm to 500 nm, and an aspect ratio, defined as mean particle diameter/mean particle thickness, of the tabular metal particles is from 8 to 40.

9. The infrared ray shielding film according to claim 1, wherein a visible light transmittance is 70% or more.

10. The infrared ray shielding film according to claim 1, wherein the hexagonal and/or circular tabular metal particles contain silver.

11. The infrared ray shielding film according to claim 1, further containing a UV absorbent.

12. The infrared ray shielding film according to claim 1, further containing an adhesive layer, wherein a UV absorbent is contained in the adhesive layer or a layer between the adhesive layer and the one or more metal particle-containing layers.

13. The infrared ray shielding film according to claim 1, wherein the at least one of the one or more metal particle-containing layers, which has at least two absorption peaks or at least two reflection peaks in a region of 800 nm to 2000 nm, is a layer in which the hexagonal and/or circular tabular metal particles and metal oxide particles are mixed and dispersed in a binder.

14. The infrared ray shielding film according to claim 1, further containing at least one of each of a metal particle-containing layer having at least two absorption peaks or at least two reflection peaks in a region of 800 nm to 2000 nm, and a metal oxide-containing layer containing metal oxide.

15. The infrared ray shielding film according to claim 1, wherein out of wavelength bands at 800 nm to 2,000 nm, a wavelength band having a reflectance of 20% or more covers at least 600 nm width.

16. The infrared ray shielding film according to claim 1, wherein the one or more metal particle-containing layers are arranged on at least one surface of a polymer film that is a substrate.

* * * * *